US012606699B2

(12) United States Patent
Washizu

(10) Patent No.: US 12,606,699 B2
(45) Date of Patent: Apr. 21, 2026

(54) POLYMER COMPOSITE, RUBBER COMPOSITION, AND TIRE

(71) Applicant: Sumitomo Rubber Industries, Ltd., Hyogo (JP)

(72) Inventor: Kensuke Washizu, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 634 days.

(21) Appl. No.: 18/000,145

(22) PCT Filed: Apr. 7, 2021

(86) PCT No.: PCT/JP2021/014691

§ 371 (c)(1),
(2) Date: Nov. 29, 2022

(87) PCT Pub. No.: WO2021/246048

PCT Pub. Date: Dec. 9, 2021

(65) Prior Publication Data

US 2023/0220191 A1 Jul. 13, 2023

(30) Foreign Application Priority Data

Jun. 1, 2020 (JP) ................................ 2020-095518

(51) Int. Cl.

| | |
|---|---|
| ***C08L 53/02*** | (2006.01) |
| ***B60C 1/00*** | (2006.01) |
| ***C08K 3/04*** | (2006.01) |

(52) U.S. Cl.

CPC ............ *C08L 53/02* (2013.01); *B60C 1/0016* (2013.01); *C08K 3/04* (2013.01)

(58) Field of Classification Search

CPC ...... C08F 279/02; C08L 53/02; C08L 51/003; C08L 51/04; C08L 87/005; B60C 1/00; B60C 1/0016

See application file for complete search history.

(56) References Cited

U.S. PATENT DOCUMENTS

| | | | |
|---|---|---|---|
| 8,415,432 | B1 | 4/2013 | Mruk et al. |
| 9,212,239 | B2 | 12/2015 | Mazumdar et al. |
| 2013/0165579 | A1 | 6/2013 | Mruk et al. |
| 2013/0165587 | A1 | 6/2013 | Mruk et al. |
| 2013/0165588 | A1 | 6/2013 | Mruk et al. |
| 2014/0011910 | A1 | 1/2014 | Mabuchi et al. |
| 2014/0148554 | A1 | 5/2014 | Ma et al. |

FOREIGN PATENT DOCUMENTS

| | | | |
|---|---|---|---|
| CN | 103502345 | A | 1/2014 |
| EP | 2 607 102 | A1 | 6/2013 |
| EP | 2 610 295 | A1 | 7/2013 |
| EP | 2 735 451 | A1 | 5/2014 |
| EP | 3385320 | A2 | 10/2018 |
| JP | 2008-214377 | A | 9/2008 |
| JP | 2013-136749 | A | 7/2013 |
| JP | 2013-139563 | A | 7/2013 |
| WO | 00/16914 | A1 | 3/2000 |
| WO | 2020/002439 | A1 | 1/2020 |
| WO | 2020/002460 | A1 | 1/2020 |

*Primary Examiner* — Jeffrey S Lenihan
(74) *Attorney, Agent, or Firm* — Studebaker Brackett PLLC

(57) ABSTRACT

Provided are a polymer composite, a rubber composition, and a tire which can reversibly vary tire performance in response to changes in temperature. The present disclosure relates to a polymer composite formed from at least one conjugated diene polymer having a weight average molecular weight of 100,000 or more as determined by gel permeation chromatography, the polymer composite reversibly satisfying the following relationship (II) with respect to the temperature dependence of contact angles of water at two temperatures differing by at least 10° C.: (II) Temperature dependence of contact angles: (Contact angle at lower temperature)/(Contact angle at higher temperature)×100≤90.

22 Claims, 1 Drawing Sheet

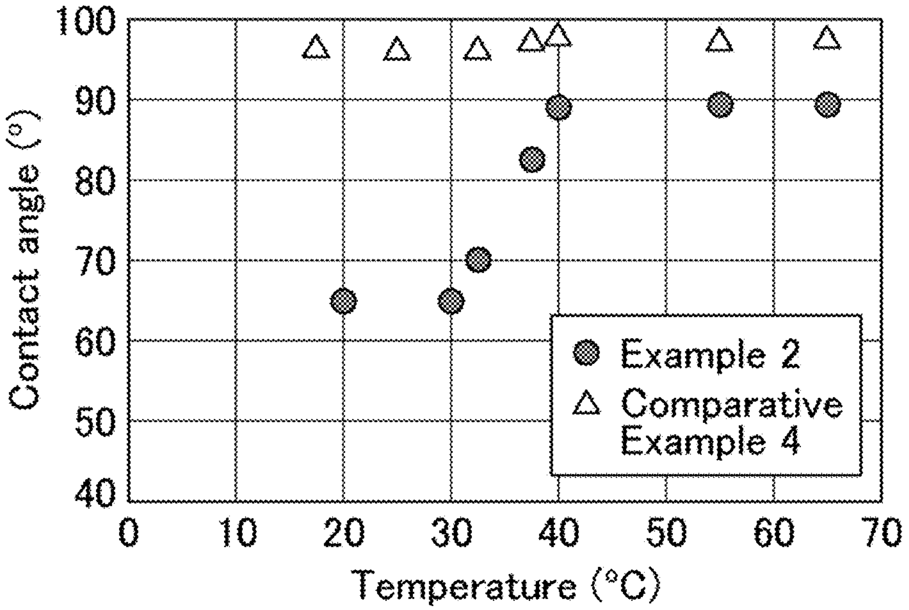
100
90
80
70
60
50
40
Contact angle (°)
0
10
20
30
40
50
60
70
Temperature (°C)
Example 2
Comparative Example 4

POLYMER COMPOSITE, RUBBER COMPOSITION, AND TIRE

TECHNICAL FIELD

The present disclosure relates to polymer composites, rubber compositions, and tires.

BACKGROUND ART

Tires with various desirable properties have been proposed (see, for example, Patent Literature 1).

CITATION LIST

Patent Literature

Patent Literature 1: JP 2008-214377 A

SUMMARY OF DISCLOSURE

Technical Problem

To date, however, the tire industry has not focused on varying tire performance in response to changes in temperature, and conventional techniques have room for improvement in varying tire performance in response to changes in temperature.

In particular, the surface properties of tires need to vary depending on the environment as follows, for example: in sunny weather (at relatively high temperatures) the surface needs to be hydrophobic to increase dry grip performance, while in rainy weather (at relatively low temperatures) the surface needs to be more hydrophilic to increase wet grip performance.

Since the surface properties (contact angle of water) of conventional rubber compositions are dependent on the compounding thereof, surface properties that change with temperature may be imparted by compounding, e.g., with a temperature-responsive material such as poly(N-isopropylacrylamide) (PNIPAM). However, such materials are soluble in water and can dissolve and disappear from the compositions in rainy weather. Thus, it has been impossible to impart reversible changes in surface properties.

The present disclosure aims to solve the above problem and provide a polymer composite, a rubber composition, and a tire which can reversibly vary tire performance in response to changes in temperature.

Solution to Problem

The present disclosure relates to a polymer composite, formed from at least one conjugated diene polymer having a weight average molecular weight of 100,000 or more as determined by gel permeation chromatography, the polymer composite reversibly satisfying the following relationship (II) with respect to a temperature dependence of contact angles of water at two temperatures differing by at least 10° C.:

$$\text{Temperature dependence of contact angles: (Contact angle at lower temperature)/(Contact angle at higher temperature)} \times 100 \leq 90. \quad \text{(II)}$$

The polymer composite preferably has at least one group that changes hydrophilicity with changes in temperature.

The group preferably shows a lower critical solution temperature in water.

The group preferably includes a poly(N-substituted (meth)acrylamide).

The group is preferably represented by the following formula (I):

(I)

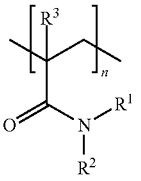

wherein n represents an integer of 1 to 1000; and $R^1$, $R^2$, and $R^3$ each independently represent a hydrogen atom or a hydrocarbyl group, provided that at least one of $R^1$ or $R^2$ is not a hydrogen atom, and $R^1$ and $R^2$ together may form a ring structure.

The group preferably includes poly(N-isopropylacrylamide).

The conjugated diene polymer preferably includes an isoprene-based rubber.

The conjugated diene polymer preferably includes a polybutadiene rubber.

The conjugated diene polymer preferably includes a styrene-butadiene rubber.

The left-hand side of relationship (II) is preferably not more than 88, more preferably not more than 85.

The polymer composite is preferably formed by stirring the conjugated diene polymer having a weight average molecular weight of 100,000 or more as determined by gel permeation chromatography, at least one radical generator, and at least one reactant having at least one heteroatom and at least one carbon-carbon double bond in at least one solvent selected from the group consisting of hydrocarbon solvents, aromatic solvents, and aprotic polar solvents at a temperature of at least 40° C. but not higher than 200° C.

The polymer composite preferably satisfies the following relationship (III) with respect to a ratio of the reactant remaining before and after the stirring:

$$\text{Ratio of remaining reactant: (Peak intensity of reactant before stirring)/[(Peak intensity of reactant before stirring)+(Peak intensity of reactant after stirring)]} \times 100 \leq 50. \quad \text{(III)}$$

The polymer composite preferably satisfies the following relationship (IV) with respect to a ratio of a conjugated diene portion of the conjugated diene polymer remaining before and after the stirring:

$$\text{Ratio of remaining conjugated diene portion: (Peak intensity of conjugated diene-derived double bonds before stirring)/[(Peak intensity of conjugated diene-derived double bonds before stirring)+(Peak intensity of conjugated diene-derived double bonds after stirring)]} \times 100 \leq 99. \quad \text{(IV)}$$

The present disclosure also relates to a rubber composition, containing the polymer composite.

The composition is preferably for use in a tire tread.

The present disclosure also relates to a tire, including a tire component including the composition.

The tire component is preferably a tread.

The present disclosure also relates to a rubber composition, reversibly satisfying the following relationship (I) with respect to a temperature dependence of contact angles of water at two temperatures differing by at least 10° C.:

Temperature dependence of contact angles: (Contact angle at lower temperature)/(Contact angle at higher temperature)×100≤90. (I)

The composition preferably contains the polymer composite.

The composition preferably contains carbon black having a nitrogen adsorption specific surface area of 145 $m^2/g$ or more.

The composition is preferably for use in a tire tread.

The present disclosure also relates to a tire, including a tire component including the composition.

The tire component is preferably a tread.

Advantageous Effects of Disclosure

The polymer composite according to the present disclosure is formed from at least one conjugated diene polymer having a weight average molecular weight of 100,000 or more as determined by gel permeation chromatography, and reversibly satisfies relationship (II) with respect to the temperature dependence of contact angles of water at two temperatures differing by at least 10° C. Thus, the polymer composite can reversibly vary tire performance in response to changes in temperature.

Moreover, the rubber composition according to the present disclosure reversibly satisfies relationship (I) with respect to the temperature dependence of contact angles of water at two temperatures differing by at least 10° C. Thus, the rubber composition can reversibly vary tire performance in response to changes in temperature.

BRIEF DESCRIPTION OF THE DRAWING

The FIGURE is a graph showing the temperature dependencies of contact angles of the polymer composites of Example 2 and Comparative Example 4.

DESCRIPTION OF EMBODIMENTS (Polymer Composite)

The polymer composite of the present disclosure is formed from at least one conjugated diene polymer having a weight average molecular weight of 100,000 or more as determined by gel permeation chromatography, and reversibly satisfies the relationship (II) below with respect to the temperature dependence of contact angles of water at two temperatures differing by at least 10° C. Thus, the polymer composite can reversibly vary tire performance in response to changes in temperature. The polymer composite is preferably formed by stirring the conjugated diene polymer having a weight average molecular weight of 100,000 or more as determined by gel permeation chromatography, at least one radical generator, and at least one reactant having at least one heteroatom and at least one carbon-carbon double bond in at least one solvent selected from the group consisting of hydrocarbon solvents, aromatic solvents, and aprotic polar solvents at a temperature of at least 40° C. but not higher than 200° C.

Temperature dependence of contact angles: (Contact angle at lower temperature)/(Contact angle at higher temperature)×100≤90 (II)

The reason for this advantageous effect is not exactly clear, but is believed to be as follows.

The polymer composite of the present disclosure is formed from a conjugated diene polymer having a weight average molecular weight of 100,000 or more as determined by gel permeation chromatography, and, for example, may be formed by stirring the conjugated diene polymer having a weight average molecular weight of 100,000 or more as determined by gel permeation chromatography, a radical generator, and a reactant having at least one heteroatom and at least one carbon-carbon double bond in at least one solvent selected from the group consisting of hydrocarbon solvents, aromatic solvents, and aprotic polar solvents at a temperature of at least 40° C. but not higher than 200° C. In other words, the polymer composite of the present disclosure may be formed by, for example, a reaction between the conjugated diene polymer and the reactant having at least one heteroatom and at least one carbon-carbon double bond. More specifically, for example, the polymer composite may be one in which the conjugated diene polymer is bound to the group formed from the reactant having at least one heteroatom and at least one carbon-carbon double bond.

As the reactant is a compound having at least one heteroatom and at least one carbon-carbon double bond, the presence of at least one carbon-carbon double bond enables radical polymerization of the reactant and further allows the reactant to be radically added to the conjugated diene polymer. Thus, the reactant has radical reactivity by virtue of the radical generator and radicals generated therefrom. Further, the reactant which has at least one heteroatom can form a group that changes hydrophilicity with changes in temperature. Thus, the polymer composite of the present disclosure is preferably one in which the conjugated diene polymer is bound to the group that changes hydrophilicity with changes in temperature.

Such a polymer composite in which the conjugated diene polymer is bound to the group that changes hydrophilicity with changes in temperature changes hydrophilicity with changes in temperature due to the presence of the group that changes hydrophilicity with changes in temperature, and thus can reversibly satisfy relationship (II) with respect to the temperature dependence of contact angles of water at two temperatures differing by at least 10° C. Moreover, satisfying relationship (II) means that the hydrophilicity changes with changes in temperature. As the hydrophilicity changes with changes in temperature, the compatibility with other components in the composition changes, and thus the polymer composite can vary tire performance in response to changes in temperature.

Further, since the group that changes hydrophilicity with changes in temperature is bound to the conjugated diene polymer in the polymer composite of the present disclosure, the group that changes hydrophilicity with changes in temperature can be inhibited from running off, e.g., by dissolving in water. Thus, the polymer composite can reversibly vary tire performance in response to changes in temperature.

Accordingly, the present disclosure solves the problem (purpose) of reversibly varying tire performance in response to changes in temperature by formulating a polymer composite satisfying the parameter of relationship (II). In other words, the parameter does not define the problem (purpose), and the problem herein is to reversibly vary tire performance in response to changes in temperature. In order to solve this problem, the polymer composite has been formulated to satisfy the parameter of relationship (II). Thus, satisfying the parameter of relationship (II) is an essential structural element.

Here, merely mixing the conjugated diene polymer with the group that changes hydrophilicity with changes in temperature (temperature-responsive polymer) does not cause binding of the conjugated diene polymer to the group that changes hydrophilicity with changes in temperature, failing to provide the polymer composite of the present disclosure.

Moreover, if a rubber composition is compounded with the temperature-responsive polymer alone, not in the form of the polymer composite, the temperature-responsive polymer may run off the rubber composition, e.g., by dissolving in water. Thus, the rubber composition cannot reversibly vary tire performance in response to changes in temperature.

As used herein, the phrase "reversibly satisfying relationship (II) with respect to the temperature dependence of contact angles of water at two temperatures differing by at least 10° C." means satisfying relationship (II) with respect to the temperature dependence of contact angles of water at two temperatures differing by at least 10° C. regardless of repeated changes in temperature or contact with water. Similarly, as used herein, the phrase "reversibly satisfying relationship (I) with respect to the temperature dependence of contact angles of water at two temperatures differing by at least 10° C." means satisfying relationship (I) with respect to the temperature dependence of contact angles of water at two temperatures differing by at least 10° C. regardless of repeated changes in temperature or contact with water.

Herein, the unit of the contact angle is "°", unless otherwise stated.

<Group that Changes Hydrophilicity with Changes in Temperature>

First, the group that changes hydrophilicity with changes in temperature is described below.

Herein, the group that changes hydrophilicity with changes in temperature may be any group that changes hydrophilicity with changes in temperature and is preferably a group that reversibly changes hydrophilicity with changes in temperature.

The group that reversibly changes hydrophilicity with changes in temperature may be a temperature-responsive polymer (temperature-responsive polymer group). Thus, the polymer composite containing the group that reversibly changes hydrophilicity with changes in temperature may refer to, for example, a polymer composite containing a group formed from a temperature-responsive polymer. Examples of such a polymer composite include a polymer composite grafted with a temperature-responsive polymer, a polymer composite containing a temperature-responsive polymer unit in the backbone, and a polymer composite containing a temperature-responsive polymer block in the backbone. These may be used alone or in combinations of two or more.

The term "temperature-responsive polymer" refers to a material which undergoes reversible changes in the conformation of the polymer chains associated with hydration and dehydration in response to changes in temperature in water, and thus reversibly changes hydrophilicity and hydrophobicity with changes in temperature. It is known that such reversible changes are attributed to a molecular structure containing in a molecule a hydrophilic group capable of forming a hydrogen bond and a hydrophobic group hardly compatible with water.

Then, the present inventor has found that a temperature-responsive polymer exhibits reversible changes in hydrophilicity and hydrophobicity with changes in temperature not only in water but also in a rubber composition. Furthermore, it has been found that a polymer composite in which the conjugated diene polymer is bound to a group that changes hydrophilicity with changes in temperature (temperature-responsive polymer group) also exhibits reversible changes in hydrophilicity and hydrophobicity with changes in temperature in a rubber composition.

Known temperature-responsive polymers include polymers that show a lower critical solution temperature (LCST, also known as lower critical consolute temperature or lower critical dissolution temperature) in water and polymers that show an upper critical solution temperature (UCST, also known as upper critical consolute temperature or upper critical dissolution temperature) in water. These may be used alone or in combinations of two or more.

The polymers that show a LCST become hydrophobic at temperatures higher than the LCST boundary as the intramolecular or intermolecular hydrophobic interaction becomes stronger to cause aggregation of the polymer chains. On the other hand, at temperatures lower than the LCST, they become hydrophilic as the polymer chains are hydrated by binding with water molecules. Thus, the polymers show a reversible phase transition behavior across the LCST.

In contrast, the polymers that show a UCST become hydrophobic and insoluble at temperatures lower than the UCST, while they become hydrophilic and soluble at temperatures higher than the UCST. Thus, the polymers show a reversible phase transition behavior across the UCST. The reason for such a UCST-type behavior is thought to be that intermolecular force can be driven by the hydrogen bonds between the side chains having a plurality of amide groups.

When the group that reversibly changes hydrophilicity with changes in temperature is a polymer that shows a LCST, as the temperature changes the polymer may become incompatible with other components in the composition so that the glass transition temperature changes. Thus, the tire performance (e.g., wet grip performance, ice grip performance) can be varied in response to changes in temperature.

In the polymer composite, the group that reversibly changes hydrophilicity with changes in temperature is preferably a polymer that shows a LCST. In other words, the group that changes hydrophilicity with changes in temperature is preferably a group that shows a lower critical solution temperature in water.

Herein, the group that shows a lower critical solution temperature (LCST) in water refers to a group which is present in a polymer composite and which shows a lower critical solution temperature in water when the group is cleaved from the polymer composite and the cleaved group (polymer) is introduced into water.

Likewise, the group that shows an upper critical solution temperature (UCST) in water herein refers to a group which is present in a polymer composite and which shows an upper critical solution temperature in water when the group is cleaved from the polymer composite and the cleaved group (polymer) is introduced into water.

The group (polymer) that shows a LCST is described below.

The group (polymer) that shows a LCST may include a single group (polymer) or a combination of two or more groups (polymers).

The group (polymer) that shows a LCST may be any group (polymer) that shows a LCST. Preferred are poly(N-substituted (meth)acrylamides). Preferred among the poly (N-substituted (meth)acrylamides) are groups represented by the following formula (I):

(I)

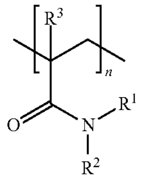

wherein n represents an integer of 1 to 1000; and $R^1$, $R^2$, and $R^3$ each independently represent a hydrogen atom or a hydrocarbyl group, provided that at least one of $R^1$ or $R^2$ is not a hydrogen atom, and $R^1$ and $R^2$ together may form a ring structure.

Preferably, n is 3 or larger, more preferably 5 or larger, still more preferably 10 or larger, particularly preferably 20 or larger, but is preferably 500 or smaller, more preferably 300 or smaller, still more preferably 150 or smaller, particularly preferably 80 or smaller, most preferably 40 or smaller, further most preferably 30 or smaller. When n is within the range indicated above, the advantageous effect tends to be better achieved.

The hydrocarbyl group for $R^1$ and $R^2$ may have any number of carbon atoms. The number of carbon atoms is preferably 1 or larger, more preferably 2 or larger, still more preferably 3 or larger, but is preferably 20 or smaller, more preferably 18 or smaller, still more preferably 14 or smaller, particularly preferably 10 or smaller, most preferably 6 or smaller, further most preferably 4 or smaller. When the number of carbon atoms is within the range indicated above, the advantageous effect tends to be better achieved.

Examples of the hydrocarbyl group for $R^1$ and $R^2$ include alkyl groups such as methyl, ethyl, n-propyl, isopropyl, n-butyl, sec-butyl, tert-butyl, n-pentyl, neopentyl, isopentyl, and n-hexyl groups; cycloalkyl groups such as a cyclohexyl group; and aryl groups such as methylphenyl and ethylphenyl groups. Alkyl groups and cycloalkyl groups are preferred among these, with alkyl groups being more preferred.

The number of carbon atoms in the ring structure formed by $R^1$ and $R^2$ is preferably 3 or larger, more preferably 4 or larger, but is preferably 7 or smaller, more preferably 5 or smaller. When the number of carbon atoms is within the range indicated above, the advantageous effect tends to be better achieved.

The hydrocarbyl group for $R^1$ and $R^2$ may be branched or unbranched but is preferably branched.

Preferably, $R^1$ and $R^2$ are each a hydrogen atom, an alkyl group (in particular, a branched alkyl group), or a cycloalkyl group, or $R^1$ and $R^2$ together form a ring structure. More preferably, $R^1$ and $R^2$ are any of the combinations shown in Table 1, still more preferably a combination of a hydrogen atom and an alkyl group (in particular, a branched alkyl group), particularly preferably a combination of a hydrogen atom and a propyl group (in particular, an isopropyl group).

TABLE 1

| $—NR^1R^2$ | Activation temperature [LCST] (° C.) |
|---|---|
| $NHCH_2—CH_3$ | 82 |
| $NH—CH_2—CH_2—CH_3$ | 22 |
| $NH—CH—(CH_3)_2$ | 32-34 |
| $N\ (CH_3)\ (CH_2—CH_3)$ | 56 |
| $N\ (CH_2—CH_3)_2$ | 32-42 |
| $N\ (CH_2—(CH_3)_2)\ (CH_3)$ | 25 |
| 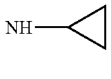 | 47 |
| 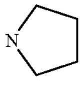 | 55 |
| 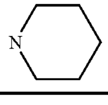 | 4 |

The hydrocarbyl group for $R^3$ may have any number of carbon atoms. The number of carbon atoms is preferably 1 or larger, but is preferably 5 or smaller, more preferably 3 or smaller, still more preferably 2 or smaller, particularly preferably 1. When the number of carbon atoms is within the range indicated above, the advantageous effect tends to be better achieved.

Examples of the hydrocarbyl group for $R^3$ include those listed for the hydrocarbyl group for $R^1$ and $R^2$. Alkyl groups are preferred among these.

The hydrocarbyl group for $R^3$ may be branched or unbranched.

$R^3$ is preferably a hydrogen atom or an alkyl group, more preferably a hydrogen atom.

Examples of the groups of formula (I) include: poly(N-alkylacrylamide) polymers such as poly(N-isopropylacrylamide), poly(N-ethylacrylamide), poly(N-n-propylacrylamide), poly(N-ethyl,N-methylacrylamide), poly(N,N-diethylacrylamide), poly(N-isopropyl,N-methylacrylamide), poly(N-cyclopropylacrylamide), poly(N-acryloylpyrrolidine), and poly(N-acryloylpiperidine); and poly(N-alkylmethacrylamide) polymers such as poly(N-isopropylmethacrylamide), poly(N-ethylmethacrylamide), poly(N-n-propylmethacrylamide), poly(N-ethyl,N-methylmethacrylamide), poly(N,N-diethylmethacrylamide), poly (N-isopropyl,N-methylmethacrylamide), poly(N-cyclopropylmethacrylamide), poly(N-methacryloylpyrrolidine), and poly(N-methacryloylpiperidine). These may be used alone or in combinations of two or more. Poly(N-isopropylacrylamide), poly(N,N-diethylacrylamide), poly(N-n-propylacrylamide), and poly(N-isopropyl,N-methylacrylamide) are preferred among these, with poly(N-isopropylacrylamide) (PNIPAM) being more preferred.

PNIPAM is a thermosensitive material that exhibits large changes in surface energy in response to small changes in temperature. For example, see N. Mori, et al., Temperature Induced Changes in the Surface Wettability of SBR+PNIPA Films, 292, Macromol. Mater. Eng. 917, 917-22 (2007).

PNIPAM has in the side chains a hydrophobic isopropyl group at the base of which is a hydrophilic amide bond.

PNIPAM becomes soluble in water at temperatures lower than 32° C., where the hydrophilic amide bond moiety forms a hydrogen bond with a water molecule. On the other hand, at temperatures not lower than 32° C., the hydrogen bond is cleaved due to the vigorous thermal motion of the molecules, and the intramolecular or intermolecular hydrophobic interaction due to the hydrophobic isopropyl group moieties in the side chains becomes stronger to cause aggregation of the polymer chains, so that PNIPAM becomes insoluble in water.

As described above, PNIPAM has a LCST, which is a switching temperature at which it switches from a hydrophilic state to a hydrophobic state, of about 32° C.

The contact angle of a water droplet placed on a PNIPAM polymer film drastically changes above and below the LCST temperature. For example, the contact angle of a water droplet placed on a PINPAM film is about 60° (hydrophilic) at below 32° C. and then, when it is heated to a temperature higher than 32° C., exceeds about 93° (hydrophobic).

A polymer composite containing a PNIPAM group, which greatly changes surface properties from hydrophilic to hydrophobic at about 32° C., may be used as a polymer composite for a rubber composition to reversibly vary tire performance in response to changes in temperature.

Examples of groups (polymers) that show a LCST other than the groups of formula (I) include poly(N-vinyl-caprolactam) represented by the formula (II) below (LCST: about 31° C.), poly(2-alkyl-2-oxazolines) represented by the formula (III) below (LCST: about 62° C. when R is an ethyl group, about 36° C. when R is an isopropyl group, and about 25° C. when R is a n-propyl group), alkyl-substituted celluloses (e.g., methyl cellulose represented by the formula (IV) below (LCST: about 50° C.), hydroxypropyl cellulose, hydroxyethyl methyl cellulose, and hydroxypropyl methyl cellulose), poly(N-ethoxyethylacrylamide) (LCST: about 35° C.), poly(N-ethoxyethylmethacrylamide) (LCST: about 45° C.), poly(N-tetrahydrofurfurylacrylamide) (LSCT: about 28° C.), poly(N-tetrahydrofurfurylmethacrylamide) (LSCT: about 35° C.), polyvinyl methyl ether, poly[2-(dimethylamino)ethyl methacrylate], poly(3-ethyl-N-vinyl-2-pyrrolidone), hydroxybutyl chitosan, polyoxyethylene (20) sorbitan monostearate, polyoxyethylene (20) sorbitan monolaurate, polyoxyethylene (20) sorbitan monooleate, poly(ethylene glycol)methacrylates containing 2 to 6 ethylene glycol units, polyethylene glycol-co-polypropylene glycols (preferably those containing 2 to 8 ethylene glycol units and 2 to 8 polypropylene units, more preferably compounds represented by the following formula (A)), ethoxylated iso-$C_{13}H_{27}$-alcohols (preferably having an ethoxylation degree of 4 to 8), polyethylene glycols containing 4 to 50, preferably 4 to 20 ethylene glycol units, polypropylene glycols containing 4 to 30, preferably 4 to 15 propylene glycol units, monomethyl, dimethyl, monoethyl, or diethyl ethers of polyethylene glycols containing 4 to 50, preferably 4 to 20 ethylene glycol units, and monomethyl, dimethyl, monoethyl, or diethyl ethers of polypropylene glycols containing 4 to 50, preferably 4 to 20 propylene glycol units. These may be used alone or in combinations of two or more.

$$HO—[—CH_2—CH_2—O]_x—[—CH(CH_3)—CH_2—O]_y—[—CH_2—CH_2—O]_z—H \quad (A)$$

In the formula, y is 3 to 10, and each of x and z is 1 to 8, provided that y+x+z=5 to 18.

(II)

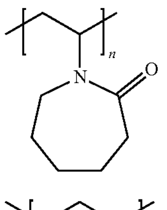

(III)

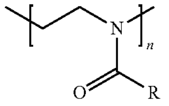

(IV)

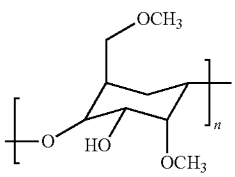

In formulas (II) to (IV), n is as defined for n in formula (I). In formula (III), R is an alkyl group selected from a n-propyl group, an isopropyl group, or an ethyl group.

The weight average molecular weight of the group that changes hydrophilicity with changes in temperature (the group formed from a temperature-responsive polymer) is preferably 330 or more, more preferably 560 or more, still more preferably 1130 or more, but is preferably 57000 or less, more preferably 34000 or less, still more preferably 17000 or less. When the weight average molecular weight is within the range indicated above, the advantageous effect tends to be better achieved.

The phase transition temperature (lower critical solution temperature (LCST) or upper critical solution temperature (UCST)) of the temperature-responsive polymer is preferably 5° C. or higher, more preferably 15° C. or higher, still more preferably 20° C. or higher, particularly preferably 25° C. or higher, but is preferably 60° C. or lower, more preferably 50° C. or lower, still more preferably 40° C. or lower, particularly preferably 35° C. or lower. When the phase transition temperature is within the range indicated above, the advantageous effect tends to be better achieved.

Herein, the phase transition temperature of the temperature-responsive polymer is measured using a temperature-controllable spectrophotometer. A temperature-responsive polymer aqueous solution adjusted at 10% by mass may be charged into a cell. The cell may be covered with a parafilm for preventing vaporization, and an in-cell temperature sensor may be attached thereto. Experiments may be carried out at a measurement wavelength of 600 nm, an acquisition temperature of 0.1° C., and a rate of temperature rise of 0.1° C. The temperature at which the transmittance reaches 90% is defined as the phase transition temperature.

Here, the temperature-responsive polymer refers to a temperature-responsive polymer group (temperature-responsive polymer) cleaved from a polymer composite containing the temperature-responsive polymer group.

<Polymer Composite Production Method>

The polymer composite is formed from at least one conjugated diene polymer having a weight average molecular weight of 100,000 or more as determined by gel permeation chromatography, and is preferably formed by stirring the conjugated diene polymer having a weight average molecular weight of 100,000 or more as determined by gel permeation chromatography, at least one radical generator, and at least one reactant having at least one heteroatom and at least one carbon-carbon double bond in at least one solvent selected from the group consisting of hydrocarbon solvents, aromatic solvents, and aprotic polar solvents at a temperature of at least 40° C. but not higher than 200° C.

Here, the polymer composite may be produced by known synthesis techniques. For example, the polymer composite may be produced with reference to JP 2005-314419 A, JP 2016-505679 T, JP 2015-531672 T, JP 2003-252936 A, JP 2004-307523 A, etc.

<<Conjugated Diene Polymer>>

The conjugated diene polymer has a weight average molecular weight (Mw) of 100,000 or more, preferably 200,000 or more, more preferably 300,000 or more, as determined by gel permeation chromatography. The upper limit of the Mw is not limited but is preferably 4,000,000 or less, more preferably 3,000,000 or less, still more preferably 2,000,000 or less, particularly preferably 1,200,000 or less. When the Mw is within the range indicated above, the advantageous effect tends to be better achieved.

Herein, the Mw and number average molecular weight (Mn) can be determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards.

Non-limiting examples of the conjugated diene polymer include diene rubbers commonly used as rubber components in tire compositions, such as isoprene-based rubbers, polybutadiene rubbers (BR), styrene-butadiene rubbers (SBR), styrene-isoprene-butadiene rubbers (SIBR), ethylene-propylene-diene rubbers (EPDM), chloroprene rubbers (CR), acrylonitrile butadiene rubbers (NBR), and butyl rubbers (IIR). These may be used alone or in combinations of two or more. Isoprene-based rubbers, BR, and SBR are preferred among these, with BR or SBR being more preferred.

The conjugated diene polymer may be a commercial product or may be polymerized according to known or other methods.

The diene rubbers may be either unmodified or modified polymers.

The modified polymers may be any polymer (preferably diene rubber) having a functional group interactive with a filler such as silica. Examples include a chain end-modified polymer obtained by modifying at least one chain end of a polymer by a compound (modifier) having the functional group (i.e., a chain end-modified polymer terminated with the functional group); a backbone-modified polymer having the functional group in the backbone; a backbone- and chain end-modified polymer having the functional group in both the backbone and chain end (e.g., a backbone- and chain end-modified polymer in which the backbone has the functional group and at least one chain end is modified by the modifier); and a chain end-modified polymer into which a hydroxy or epoxy group has been introduced by modification (coupling) with a polyfunctional compound having two or more epoxy groups in the molecule. These may be used alone or in combinations of two or more.

Examples of the functional group include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxy, oxy, and epoxy groups. Here, these functional groups may be substituted. These may be used alone or in combinations of two or more. Amino groups (preferably amino groups whose hydrogen atom is replaced with a C1-C6 alkyl group), alkoxy groups (preferably C1-C6 alkoxy groups), and alkoxysilyl groups (preferably C1-C6 alkoxysilyl groups) are preferred among these.

Any SBR may be used. Examples include emulsion-polymerized styrene-butadiene rubbers (E-SBR) and solution-polymerized styrene-butadiene rubbers (S-SBR). These may be used alone or in combinations of two or more.

The styrene content of the SBR is preferably 5% by mass or higher, more preferably 10% by mass or higher, still more preferably 15% by mass or higher, particularly preferably 20% by mass or higher. The styrene content is also preferably 60% by mass or lower, more preferably 50% by mass or lower, still more preferably 40% by mass or lower, particularly preferably 30% by mass or lower. When the styrene content is within the range indicated above, the advantageous effect tends to be better achieved.

Herein, the styrene content of the SBR is calculated by $^1$H-NMR analysis.

For example, SBR products manufactured or sold by Sumitomo Chemical Co., Ltd., JSR Corporation, Asahi Kasei Corporation, Zeon Corporation, etc. may be used as the SBR.

The SBR may be either unmodified or modified SBR. Examples of the modified SBR include those into which functional groups as listed for the modified polymers have been introduced. Unmodified SBR is preferred among these.

Any BR may be used. Examples include high-cis BR having a high cis content, BR containing syndiotactic polybutadiene crystals, and BR synthesized using rare earth catalysts (rare earth-catalyzed BR). These may be used alone or in combinations of two or more. Rare earth-catalyzed BR is preferred among these.

The cis content of the BR is preferably 90% by mass or higher, more preferably 95% by mass or higher. The upper limit is not limited. When the cis content is within the range indicated above, the advantageous effect tends to be better achieved.

Here, the cis content can be measured by infrared absorption spectrometry.

Moreover, the BR may be either unmodified or modified BR. Examples of the modified BR include those into which functional groups as listed for the modified polymers have been introduced. Unmodified BR is preferred among these.

The BR may be commercially available from, for example, Ube Industries, Ltd., JSR Corporation, Asahi Kasei Corporation, Zeon Corporation, etc.

Examples of isoprene-based rubbers include natural rubbers (NR), polyisoprene rubbers (IR), refined NR, modified NR, and modified IR. Examples of NR include those commonly used in the tire industry such as SIR20, RSS #3, and TSR20. Any IR may be used, including for example those commonly used in the tire industry such as IR2200. Examples of refined NR include deproteinized natural rubbers (DPNR) and highly purified natural rubbers (UPNR). Examples of modified NR include epoxidized natural rubbers (ENR), hydrogenated natural rubbers (HNR), and grafted natural rubbers. Examples of modified IR include epoxidized polyisoprene rubbers, hydrogenated polyisoprene rubbers, and grafted polyisoprene rubbers. These may be used alone or in combinations of two or more. NR is preferred among these.

<<Radical Generator>>

Any radical generator may be used, including for example those commonly used as radical initiators such as azo compounds, organic oxides, dihalogens, and redox initiators. These may be used alone or in combinations of two or more.

The azo compounds may be any compound containing an azo bond. Examples include azobisisobutyronitrile (AIBN), azodicarbonamide, 2,2'-azobis-(2-amidinopropane)dihydrochloride, dimethyl 2,2'-azobis(isobutyrate), azobis-cyanovaleric acid, 1,1'-azobis-(2,4-dimethylvaleronitrile), azobismethylbutyronitrile, and 2,2'-azobis-(4-methoxy-2,4-dimethylvaleronitrile). These may be used alone or in combinations of two or more. Azobisisobutyronitrile (AIBN) is preferred among these.

Any organic oxide may be used, including for example di-tert-butyl peroxide, tert-butyl hydroperoxide, paramenthane hydroperoxide, diisopropylbenzene hydroperoxide, diisopropylbenzene hydroperoxide, acetylcyclohexanesulfonyl peroxide, diisopropyl perdicarbonate, di-secondary-butyl perdicarbonate, benzoyl peroxide, and lauroyl peroxide. Examples of the azo compounds include azobisisobutyronitrile, azobismethoxydimethylvaleronitrile, azobisdimethylvaleronitrile, and azobisaminopropane hydrochloride. These may be used alone or in combinations of two or more.

Any dihalogen may be used, including for example chlorine, bromine, and iodine. These may be used alone or in combinations of two or more.

The redox initiators may be any combination of a peroxide with a reducing agent, examples of which include combinations of hydrogen peroxide with iron (II) salts and combinations of peroxide salts such as potassium peroxodisulfate with sodium hydrogen sulfite. These may be used alone or in combinations of two or more.

Preferred among the radical generators are azo compounds, with azobisisobutyronitrile (AIBN) being more preferred.

<<Reactant Having at Least One Heteroatom and at Least One Carbon-Carbon Double Bond>>

The reactant having at least one heteroatom and at least one carbon-carbon double bond may be any reactant that has at least one heteroatom and at least one carbon-carbon double bond. Such reactants may be used alone or in combinations of two or more.

Any heteroatom may be used, including for example an oxygen atom, a nitrogen atom, a silicon atom, and a sulfur atom. Among these, the reactant preferably has an oxygen atom and a nitrogen atom, and more preferably has one oxygen atom and one nitrogen atom.

The number of carbon-carbon double bonds in the reactant is not limited, but is preferably one.

Specifically, the reactant may be any compound capable of forming a group that changes hydrophilicity with changes in temperature (temperature-responsive polymer (temperature-responsive polymer group)) as described above, and is preferably a compound capable of forming the group that changes hydrophilicity with changes in temperature (temperature-responsive polymer (temperature-responsive polymer group)) by radical polymerization.

Since a temperature-responsive polymer features a structure containing both a hydrophobic group and a hydrophilic group, the compound (monomer) capable of forming a temperature-responsive polymer inevitably has at least one heteroatom.

The reactant is preferably a compound capable of forming a group that shows a lower critical solution temperature in water, more preferably a compound capable of forming a poly(N-substituted (meth)acrylamide), still more preferably a compound capable of forming a group represented by formula (I), particularly preferably a compound capable of forming poly(N-isopropylacrylamide).

For example, a polymer composite having PNIPAM may be produced by using, as the reactant, isopropylacrylamide (NIPAM) which is a monomer that forms PNIPAM.

More specific examples of the reactant include alkylacrylamides such as isopropylacrylamide (NIPAM) which is a monomer that forms PNIPAM, ethylacrylamide, n-propylacrylamide (NNPAM) which is a monomer that forms PNNPAM, ethyl, methylacrylamide, diethylacrylamide (NDEAM) which is a monomer that forms PNDEAM, isopropyl, methylacrylamide (NMNIPAM) which is a monomer that forms PNMNIPAM, cyclopropylacrylamide, acryloylpyrrolidine, and acryloylpiperidine;

alkylmethacrylamides such as isopropylmethacrylamide, ethylmethacrylamide, n-propylmethacrylamide, ethyl, methylmethacrylamide, diethylmethacrylamide, isopropyl, methylmethacrylamide, cyclopropylmethacrylamide, methacryloylpyrrolidine, and methacryloylpiperidine; and vinyl-caprolactam, 2-alkyl-2-oxazolines, ethoxyethylacrylamide, ethoxyethylmethacrylamide, tetrahydrofurfurylacrylamide, tetrahydrofurfurylmethacrylamide, vinyl methyl ether, 2-(dimethylamino)ethyl methacrylate, 3-ethyl-N-vinyl-2-pyrrolidone, and monomers of epoxide/allyl glycidyl ether copolymers. These may be used alone or in combinations of two or more. Alkylacrylamides are preferred among these. More preferred are isopropylacrylamide (NIPAM), n-propylacrylamide (NNPAM), diethylacrylamide (NDEAM), and isopropyl, methylacrylamide (NMNIPAM), with isopropylacrylamide (NIPAM) being still more preferred.

<<Solvent>>

Any solvent may be used, including for example at least one solvent selected from the group consisting of hydrocarbon solvents, aromatic solvents, and aprotic polar solvents. These may be used alone or in combinations of two or more. The solvent may be selected appropriately according to the radical generation temperature of the radical generator used.

Any hydrocarbon solvent may be used, including for example linear hydrocarbon solvents such as pentane, hexane, heptane, and octane, and cyclic hydrocarbon solvents such as cyclohexane and terpene solvents. These may be used alone or in combinations of two or more.

Any aromatic solvent may be used, including for example aromatic hydrocarbon solvents such as benzene, toluene, ethylbenzene, and xylene, and heterocyclic aromatic solvents such as pyridine. These may be used alone or in combinations of two or more.

Any aprotic polar solvent may be used, including for example diethyl ether, tetrahydrofuran, dimethylsulfoxide, dimethylformamide, and dimethylacetamide. These may be used alone or in combinations of two or more.

Preferred among the solvents are hydrocarbon solvents, with linear hydrocarbon solvents or cyclic hydrocarbon solvents being more preferred, with hexane or cyclohexane being still more preferred.

Also preferred are aprotic polar solvents, with tetrahydrofuran being more preferred.

<<Stirring>>

The polymer composite may be formed by stirring the conjugated diene polymer, the radical generator, and the reactant in the solvent at a temperature of at least 40° C. but not higher than 200° C.

The temperature during the stirring is preferably at least 40° C. but not higher than 200° C. At a temperature of at least 40° C., the reaction tends to proceed sufficiently, while at a temperature of not higher than 200° C., degradation of the conjugated diene polymer tends to be inhibited. The lower limit is more preferably at least 50° C., still more preferably at least 60° C., while the upper limit is more preferably not higher than 180° C., still more preferably not higher than 160° C., particularly preferably not higher than 140° C., most preferably not higher than 120° C. When the temperature is within the range indicated above, the advantageous effect tends to be better achieved.

The stirring method and the stirring rate are not limited as long as the components in the solvent are miscible with each other.

The stirring time (reaction time) is not limited, but is preferably 0.5 hours or longer, more preferably 1 hour or longer, still more preferably 2 hours or longer, particularly preferably 4 hours or longer. The upper limit is not limited, but is preferably 24 hours or shorter, more preferably 12 hours or shorter, still more preferably 6 hours or shorter. When the stirring time is within the range indicated above, the advantageous effect tends to be better achieved.

The amounts of the conjugated diene polymer, the radical generator, the reactant, and the solvent used to produce the polymer composite are not limited, but are preferably as described below. When the amounts are within the ranges indicated below, the advantageous effect tends to be better achieved.

The amount of the reactant(s) used per 100 parts by mass of the conjugated diene polymer(s) is preferably 1 part by mass or more, more preferably 3 parts by mass or more, but is preferably 200 parts by mass or less, more preferably 120 parts by mass or less.

The amount of the radical generator(s) used per 100 mol of the reactant(s) is preferably 0.001 mol or more, more preferably 0.01 mol or more, but is preferably 1.0 mol or less, more preferably 0.1 mol or less.

The amount of the solvent(s) used is not limited as long as the conjugated diene polymer, radical generator, and reactant are sufficiently miscible. For example, the amount is about 18 times (mL/g) the amount of monomers used.

The relationship (III) below is preferably satisfied with respect to the ratio of the reactant remaining before and after the stirring. This proves that the reaction rate of the reactant is high, and the reactant is reacted during the stirring. Thus, the advantageous effect tends to be better achieved.

Ratio of remaining reactant: (Peak intensity of reactant before stirring)/[(Peak intensity of reactant before stirring)+(Peak intensity of reactant after stirring)]×100≤50 (III)

The left-hand side of relationship (III) is preferably not more than 50, more preferably not more than 40, still more preferably not more than 30. The lower limit is not limited, but is preferably not less than 0.01, more preferably not less than 0.1, still more preferably not less than 0.5. When the left-hand side is within the range indicated above, the reaction rate of the reactant is high, and the advantageous effect tends to be better achieved.

Herein, the left-hand side of relationship (III) is measured as described in EXAMPLES.

The relationship (IV) below is preferably satisfied with respect to the ratio of the conjugated diene portion of the conjugated diene polymer remaining before and after the stirring. This proves that the radicals derived from the reactant are sufficiently reacted with the conjugated diene polymer. Thus, the advantageous effect tends to be better achieved.

Ratio of remaining conjugated diene portion: (Peak intensity of conjugated diene-derived double bonds before stirring)/[(Peak intensity of conjugated diene-derived double bonds before stirring)+(Peak intensity of conjugated diene-derived double bonds after stirring)]×100≤99 (IV)

The left-hand side of relationship (IV) is preferably not more than 99, more preferably not more than 98, still more preferably not more than 97. The lower limit is not limited, but is preferably not less than 0.01, more preferably not less than 0.1, still more preferably not less than 10, particularly preferably not less than 50, most preferably not less than 80. When the left-hand side is within the range indicated above, the reaction rate of the reactant is high, and the advantageous effect tends to be better achieved.

Herein, the left-hand side of relationship (IV) is measured as described in EXAMPLES.

The following describes the ends of a temperature-responsive polymer (for example, a group represented by any of formulas (I) to (IV)).

In the case of the polymer composite grafted with a temperature-responsive polymer, one end of the temperature-responsive polymer forms the main chain or a bond to the main chain, and the other end is usually a hydrogen atom but may be bound to a radical generator such as azobisisobutyronitrile (AIBN).

The polymer composite produced by the above-mentioned method reversibly satisfies the following relationship (II) with respect to the temperature dependence of contact angles of water at two temperatures differing by at least 10° C.:

Temperature dependence of contact angles: (Contact angle at lower temperature)/(Contact angle at higher temperature)×100≤90. (II)

Herein, the contact angle of water of the polymer composite is measured as described in EXAMPLES.

The two temperatures differing by at least 10° C. are not limited as long as the temperatures fall within the service temperature range of a tire, and preferably fall within a range of −80° C. to 80° C. The lower limit of the temperature range is more preferably −50° C. or higher, still more preferably −20° C. or higher, while the upper limit of the temperature range is more preferably 80° C. or lower, still more preferably 50° C. or lower. The two temperatures depend on the chemical structure of the temperature-responsive polymer. This is because the critical solution temperature of the temperature-responsive polymer depends on the chemical structure of the temperature-responsive polymer.

For example, the two temperatures differing by at least 10° C. may be 20° C. and 40° C.

The left-hand side of relationship (II) is not more than 90.

In general, a conjugated diene polymer has a constant contact angle of water at any temperature of 90° or larger exhibiting hydrophobicity. In contrast, the present polymer composite exhibits hydrophobicity at one temperature but exhibits more hydrophilicity at a temperature lower by at least 10° C. than the one temperature as the contact angle is reduced by 90 percent or more.

The left-hand side of relationship (II) is preferably not more than 88, more preferably not more than 85, still more preferably not more than 80, particularly preferably not more than 78, most preferably not more than 77, further preferably not more than 76, further preferably not more than 74, further preferably not more than 72, further preferably not more than 71, further preferably not more than 70, further preferably not more than 68, further preferably not more than 66. The lower limit is not limited, but is preferably not less than 5, more preferably not less than 10, still more preferably not less than 30, particularly preferably not less than 50, most preferably not less than 64. When the left-hand side is within the range indicated above, the advantageous effect tends to be better achieved.

The contact angle (°) of water at 20° C. of the polymer composite is preferably 90 or smaller, more preferably 89 or smaller, still more preferably 88 or smaller, particularly preferably 80 or smaller, most preferably 78 or smaller, further preferably 76 or smaller, further preferably 74 or smaller, further preferably 73 or smaller, further preferably 72 or smaller, further preferably 71 or smaller, further preferably 70 or smaller, further preferably 68 or smaller, further preferably 65 or smaller, further preferably 64 or smaller. The lower limit is not limited, but is preferably 10 or larger, more preferably 30 or larger, still more preferably 40 or larger, particularly preferably 50 or larger, most preferably 62 or larger. When the contact angle is within the range indicated above, the advantageous effect tends to be better achieved.

Here, as is clear from the above description, the left-hand side of relationship (II) and the contact angle of water at 20° C. of the polymer composite may be appropriately controlled by the type and amount of the group that changes hydrophilicity with changes in temperature (temperature-responsive polymer) in the polymer composite. For example, the left-hand side of relationship (II) and the contact angle of water at 20° C. tend to be reduced by increasing the amount of the group that changes hydrophilicity with changes in temperature (temperature-responsive polymer).

As is clear from the above description, the polymer composite preferably has at least one group that changes hydrophilicity with changes in temperature, more preferably at least one group that shows a lower critical solution temperature in water, still more preferably at least one poly(N-substituted (meth)acrylamide) group, particularly preferably at least one group represented by formula (I), most preferably at least one poly(N-isopropylacrylamide) group.

The amount of the group(s) that changes hydrophilicity with changes in temperature (the group(s) formed from the reactant(s)) based on 100% by mass of the polymer composite is preferably 1% by mass or more, more preferably 3% by mass or more, still more preferably 5% by mass or more, particularly preferably 7% by mass or more, but is preferably 70% by mass or less, more preferably 60% by mass or less, still more preferably 55% by mass or less. When the amount is within the range indicated above, the advantageous effect tends to be better achieved.

The amount of the conjugated diene polymer(s) based on 100% by mass of the polymer composite is preferably 30% by mass or more, more preferably 40% by mass or more, still more preferably 45% by mass or more, but is preferably 99% by mass or less, more preferably 97% by mass or less, still more preferably 95% by mass or less, particularly preferably 93% by mass or less. When the amount is within the range indicated above, the advantageous effect tends to be better achieved.

The combined amount of the group(s) that changes hydrophilicity with changes in temperature (the group(s) formed from the reactant(s)) and the conjugated diene polymer(s) based on 100% by mass of the polymer composite is preferably 80% by mass or more, more preferably 85% by mass or more, still more preferably 90% by mass or more, particularly preferably 95% by mass or more, most preferably 98% by mass or more, and may be 100% by mass. When the combined amount is within the range indicated above, the advantageous effect tends to be better achieved.

Here, the amounts of the group(s) that changes hydrophilicity with changes in temperature (the group(s) formed from the reactant(s)) and the conjugated diene polymer(s) in the polymer composite are measured by NMR.

The polymer composite may be used as a rubber component for rubber compositions.

(Rubber Composition 1)

A rubber composition 1 contains the above-described polymer composite. The polymer composite may include a single polymer composite or a combination of two or more polymer composites.

Since the polymer composite contains the conjugated diene polymer, only the conjugated diene polymer in the polymer composite may be used as a rubber component, or the conjugated diene polymer in the polymer composite may be used together with additional rubber components.

Examples of such additional rubber components include the above-mentioned diene rubbers. These may be used alone or in combinations of two or more.

Here, the additional rubber components and their suitable embodiments may be as described for the conjugated diene polymer.

The rubber composition preferably contains the polymer composite(s) in such an amount that the amount of the group(s) that changes hydrophilicity with changes in temperature (the group(s) formed from the reactant(s)) per 100 parts by mass of the rubber component content is preferably 1 part by mass or more, more preferably 3 parts by mass or more, still more preferably 5 parts by mass or more, particularly preferably 8 parts by mass or more, but is preferably 200 parts by mass or less, more preferably 180 parts by mass or less, still more preferably 160 parts by mass or less, particularly preferably 140 parts by mass or less, most preferably 120 parts by mass or less. When the amount is within the range indicated above, the advantageous effect tends to be better achieved.

The amount of SBR based on 100% by mass of the rubber component content is preferably 1% by mass or more, more preferably 10% by mass or more, still more preferably 20% by mass or more, and may be 100% by mass, but is preferably 90% by mass or less. When the amount is within the range indicated above, the advantageous effect tends to be better achieved.

The amount of BR based on 100% by mass of the rubber component content is preferably 1% by mass or more, more preferably 10% by mass or more, still more preferably 20% by mass or more, and may be 100% by mass, but is preferably 90% by mass or less. When the amount is within the range indicated above, the advantageous effect tends to be better achieved.

The amount of isoprene-based rubbers based on 100% by mass of the rubber component content is preferably 1% by mass or more, more preferably 10% by mass or more, still more preferably 20% by mass or more, and may be 100% by mass, but is preferably 90% by mass or less. When the amount is within the range indicated above, the advantageous effect tends to be better achieved.

The rubber composition preferably contains silica as a filler (reinforcing filler).

Any silica may be used, and examples include dry silica (anhydrous silicic acid) and wet silica (hydrous silicic acid). These may be used alone or in combinations of two or more. Among these, wet silica is preferred because it has a large number of silanol groups.

The silica may be commercially available from, for example, Degussa, Rhodia, Tosoh Silica Corporation, Solvay Japan, Tokuyama Corporation, etc.

The nitrogen adsorption specific surface area ($N_2SA$) of the silica is preferably 50 $m^2/g$ or more, more preferably 80 $m^2/g$ or more, still more preferably 150 $m^2/g$ or more. The $N_2SA$ is also preferably 300 $m^2/g$ or less, more preferably 250 $m^2/g$ or less, still more preferably 200 $m^2/g$ or less. When the $N_2SA$ is within the range indicated above, the advantageous effect tends to be better achieved.

Here, the $N_2SA$ of the silica can be measured in accordance with ASTM D3037-81.

The amount of silica per 100 parts by mass of the rubber component content is preferably 0.1 parts by mass or more, more preferably 5 parts by mass or more, still more preferably 10 parts by mass or more, particularly preferably 20 parts by mass or more, but is preferably 200 parts by mass or less, more preferably 180 parts by mass or less, still more preferably 150 parts by mass or less, particularly preferably 120 parts by mass or less, most preferably 100 parts by mass or less. When the amount is within the range indicated above, the advantageous effect tends to be better achieved.

When the rubber composition contains silica, it preferably contains a silane coupling agent together with the silica.

Any silane coupling agent may be used, and examples include sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl) tetrasulfide, bis(2-triethoxysilylethyl)trisulfide, bis(4-trimethoxysilylbutyl)trisulfide, bis(3-triethoxysilylpropyl) disulfide, bis(2-triethoxysilylethyl)disulfide, bis(4-triethoxysilylbutyl)disulfide, bis(3-trimethoxysilylpropyl) disulfide, bis(2-trimethoxysilylethyl)disulfide, bis(4-trimethoxysilylbutyl)disulfide, 3-trimethoxysilylpropyl-N,N-dimethylthiocarbamoyltetrasulfide, 2-triethoxysilylethyl-N,N-dimethylthiocarbamoyltetrasulfide, and 3-triethoxysilylpropyl methacrylate monosulfide; mercapto silane coupling agents such as 3-mercaptopropyltrimethoxysilane, 2-mercaptoethyltriethoxysilane, and NXT and NXT-Z both available from Momentive; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. These may be used alone or in combinations of two or more. Sulfide silane coupling agents are preferred among these.

The silane coupling agents may be commercially available from, for example, Degussa, Momentive, Shin-Etsu Silicone, Tokyo Chemical Industry Co., Ltd., AZmax. Co., Dow Corning Toray Co., Ltd., etc.

The amount of silane coupling agents, if present, per 100 parts by mass of the silica content is preferably 0.1 parts by mass or more, more preferably 1 part by mass or more, still more preferably 2 parts by mass or more. The amount is also preferably 20 parts by mass or less, more preferably 15 parts by mass or less, still more preferably 12 parts by mass or less. When the amount is within the range indicated above, the advantageous effect tends to be better achieved.

The rubber composition preferably contains carbon black.

Examples of carbon black include N134, N110, N220, N234, N219, N339, N330, N326, N351, N550, and N762. These may be used alone or in combinations of two or more.

The nitrogen adsorption specific surface area ($N_2SA$) of the carbon black is preferably 5 $m^2/g$ or more, more preferably 30 $m^2/g$ or more, still more preferably 60 $m^2/g$ or more, particularly preferably 90 $m^2/g$ or more, most preferably 120 $m^2/g$ or more, further most preferably 130 $m^2/g$ or more, still further most preferably 140 $m^2/g$ or more, particularly most preferably 145 $m^2/g$ or more. The $N_2SA$ is also preferably 300 $m^2/g$ or less, more preferably 200 $m^2/g$ or less, still more preferably 180 $m^2/g$ or less. When the $N_2SA$ is within the range indicated above, the advantageous effect tends to be better achieved.

Here, the nitrogen adsorption specific surface area of the carbon black can be measured in accordance with JIS K6217-2:2001.

The dibutyl phthalate oil absorption (DBP) of the carbon black is preferably 5 ml/100 g or more, more preferably 70 ml/100 g or more, still more preferably 90 ml/100 g or more. The DBP is also preferably 300 ml/100 g or less, more preferably 200 ml/100 g or less, still more preferably 160 ml/100 g or less, particularly preferably 140 ml/100 g or less. When the DBP is within the range indicated above, the advantageous effect tends to be better achieved.

Here, the DBP of the carbon black can be measured in accordance with JIS-K6217-4:2001.

The carbon black may be commercially available from, for example, Asahi Carbon Co., Ltd., Cabot Japan K.K., Tokai Carbon Co., Ltd., Mitsubishi Chemical Corporation, Lion Corporation, NSCC Carbon Co., Ltd., Columbia Carbon, etc.

The amount of carbon black per 100 parts by mass of the rubber component content is preferably 0.1 parts by mass or more, more preferably 1 part by mass or more, still more preferably 3 parts by mass or more, particularly preferably 5 parts by mass or more, but is preferably 200 parts by mass or less, more preferably 150 parts by mass or less, still more preferably 120 parts by mass or less, particularly preferably 80 parts by mass or less. When the amount is within the range indicated above, the advantageous effect tends to be better achieved.

The rubber composition preferably contains sulfur.

Examples of sulfur include those commonly used in the rubber industry, such as powdered sulfur, precipitated sulfur, colloidal sulfur, insoluble sulfur, highly dispersible sulfur, and soluble sulfur. These may be used alone or in combinations of two or more.

The sulfur may be commercially available from, for example, Tsurumi Chemical Industry Co., Ltd., Karuizawa Sulfur Co., Ltd., Shikoku Chemicals Corporation, Flexsys, Nippon Kanryu Industry Co., Ltd., Hosoi Chemical Industry Co., Ltd., etc.

The amount of sulfur per 100 parts by mass of the rubber component content is preferably 0.1 parts by mass or more, more preferably 0.5 parts by mass or more, still more preferably 1 part by mass or more. The amount is also preferably 20 parts by mass or less, more preferably 10 parts by mass or less, still more preferably 8 parts by mass or less, particularly preferably 5 parts by mass or less. When the amount is within the range indicated above, the advantageous effect tends to be better achieved.

The rubber composition preferably contains a vulcanization accelerator.

Examples of vulcanization accelerators include thiazole vulcanization accelerators such as 2-mercaptobenzothiazole and di-2-benzothiazolyl disulfide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazolylsulfenamide, N-t-butyl-2-benzothiazolylsulfenamide, N-oxyethylene-2-benzothiazole sulfenamide, and N,N'-diisopropyl-2-benzothiazole sulfenamide; guanidine vulcanization accelerators such as diphenylguanidine, diorthotolylguanidine, and orthotolylbiguanidine; thiourea vulcanization accelerators; dithiocarbamate vulcanization accelerators; aldehyde-amine or aldehyde-ammonia vulcanization accelerators; imidazoline vulcanization accelerators; and xanthate vulcanization accelerators. These may be used alone or in combinations of two or more. Sulfenamide and/or guanidine vulcanization accelerators are preferred among these.

The vulcanization accelerators may be commercially available from, for example, Kawaguchi Chemical Industry Co., Ltd., Ouchi Shinko Chemical Industrial Co., Ltd., Rhein Chemie, etc.

The amount of vulcanization accelerators per 100 parts by mass of the rubber component content is preferably 0.1 parts by mass or more, more preferably 0.5 parts by mass or more, still more preferably 1 part by mass or more. The amount is also preferably 20 parts by mass or less, more preferably 10 parts by mass or less, still more preferably 8 parts by mass or less, particularly preferably 5 parts by mass or less. When the amount is within the range indicated above, the advantageous effect tends to be better achieved.

The rubber composition preferably contains stearic acid.

The stearic acid used may be a conventional one, e.g., available from NOF Corporation, Kao Corporation, Fujifilm Wako Pure Chemical Corporation, Chiba Fatty Acid Co., Ltd, etc.

The amount of stearic acid per 100 parts by mass of the rubber component content is preferably 0.1 parts by mass or more, more preferably 0.5 parts by mass or more, still more preferably 1 part by mass or more. The amount is also preferably 20 parts by mass or less, more preferably 10 parts by mass or less, still more preferably 8 parts by mass or less, particularly preferably 5 parts by mass or less. When the amount is within the range indicated above, the advantageous effect tends to be better achieved.

The rubber composition may contain zinc oxide.

The zinc oxide used may be a conventional one, e.g., available from Mitsui Mining & Smelting Co., Ltd., Toho Zinc Co., Ltd., HakusuiTech Co., Ltd., Seido Chemical Industry Co., Ltd., Sakai Chemical Industry Co., Ltd., etc.

The amount of zinc oxide per 100 parts by mass of the rubber component content is preferably 0.1 parts by mass or more, more preferably 0.5 parts by mass or more, still more preferably 1 part by mass or more. The amount is also preferably 20 parts by mass or less, more preferably 10 parts by mass or less, still more preferably 8 parts by mass or less, particularly preferably 5 parts by mass or less. When the amount is within the range indicated above, the advantageous effect tends to be better achieved.

The rubber composition may contain an antioxidant.

Examples of antioxidants include naphthylamine antioxidants such as phenyl-a-naphthylamine; diphenylamine antioxidants such as octylated diphenylamine and 4,4'-bis(α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as polymerized 2,2,4-trimethyl-1,2-dihydroquinoline; monophenolic antioxidants such as 2,6-di-t-butyl-4-methylphenol and styrenated phenol; and bis-, tris-, or polyphenolic antioxidants such as tetrakis[methylene-3-(3',5'-di-t-butyl-4'-hydroxyphenyl)propionate]methane. These may be used alone or in combinations of two or more. Among these, p-phenylenediamine or quinoline antioxidants are preferred, and p-phenylenediamine antioxidants are more preferred.

The antioxidants may be commercially available from, for example, Seiko Chemical Co., Ltd., Sumitomo Chemical Co., Ltd., Ouchi Shinko Chemical Industrial Co., Ltd., Flexsys, etc.

The amount of antioxidants per 100 parts by mass of the rubber component content is preferably 0.1 parts by mass or more, more preferably 0.5 parts by mass or more, still more preferably 1 part by mass or more. The amount is also preferably 20 parts by mass or less, more preferably 10 parts by mass or less, still more preferably 8 parts by mass or less, particularly preferably 5 parts by mass or less. When the amount is within the range indicated above, the advantageous effect tends to be better achieved.

The rubber composition may contain a wax.

Any wax may be used, and examples include petroleum waxes such as paraffin waxes and microcrystalline waxes; naturally-occurring waxes such as plant waxes and animal waxes; and synthetic waxes such as polymers of ethylene, propylene, or other similar monomers. These may be used alone or in combinations of two or more.

The waxes may be commercially available from, for example, Ouchi Shinko Chemical Industrial Co., Ltd., Nippon Seiro Co., Ltd., Seiko Chemical Co., Ltd., etc.

The amount of waxes per 100 parts by mass of the rubber component content is preferably 0.1 parts by mass or more, more preferably 0.5 parts by mass or more, still more preferably 1 part by mass or more. The amount is also preferably 20 parts by mass or less, more preferably 10 parts by mass or less, still more preferably 8 parts by mass or less, particularly preferably 5 parts by mass or less. When the amount is within the range indicated above, the advantageous effect tends to be better achieved.

The rubber composition may contain a plasticizer.

Herein, the term "plasticizer" refers to a material that can impart plasticity to rubbers and conceptionally includes liquid plasticizers (plasticizers which are liquid at 25° C.) and solid plasticizers (plasticizers which are solid at 25° C.). Specifically, it is a component that can be extracted with acetone from the composition thereof. Such plasticizers may be used alone or in combinations of two or more.

Specific examples of plasticizers include oils, ester plasticizers, liquid resins, and solid resins (all of which may collectively be referred to as "oils and the like"). These may be used alone or in combinations of two or more.

The amount of plasticizers per 100 parts by mass of the rubber component content is preferably 0.1 parts by mass or more, more preferably 0.5 parts by mass or more, still more preferably 1 part by mass or more, particularly preferably 5 parts by mass or more. The amount is also preferably 100 parts by mass or less, more preferably 80 parts by mass or less, still more preferably 60 parts by mass or less, particularly preferably 40 parts by mass or less. When the amount is within the range indicated above, the advantageous effect tends to be better achieved.

Any oil may be used, and examples include conventional oils, including: process oils such as paraffinic process oils, aromatic process oils, and naphthenic process oils; low polycyclic aromatic (PCA) process oils such as TDAE and MES; vegetable oils; and mixtures of the foregoing oils. These may be used alone or in combinations of two or more. Aromatic process oils are preferred among these. Specific examples of the aromatic process oils include Diana Process Oil AH series produced by Idemitsu Kosan Co., Ltd.

The oils may be commercially available from, for example, Idemitsu Kosan Co., Ltd., Sankyo Yuka Kogyo K.K., Japan Energy Corporation, Olisoy, H&R, Hokoku Corporation, Showa Shell Sekiyu K.K., Fuji Kosan Co., Ltd., etc.

Examples of ester plasticizers include the vegetable oils mentioned above; synthetic plasticizers and processed vegetable oils, such as glycerol fatty acid monoesters, glycerol fatty acid diesters, and glycerol fatty acid triesters; and phosphoric acid esters (e.g., phosphate plasticizers and mixtures thereof). These may be used alone or in combinations of two or more.

Suitable examples of the ester plasticizers include fatty acid esters represented by the following formula:

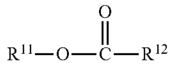

wherein $R^{11}$ represents a C1-C8 linear or branched alkyl group, a C1-C8 linear or branched alkenyl group, or a C2-C6 linear or branched alkyl group substituted with 1 to 5 hydroxy groups; and $R^2$ represents a C11-C21 alkyl or alkenyl group.

Examples of $R^{11}$ include methyl, ethyl, 2-ethylhexyl, isopropyl, and octyl groups, and groups obtained by substituting these groups with 1 to 5 hydroxy groups. Examples of $R^{12}$ include linear or branched alkyl or alkenyl groups such as lauryl, myristyl, palmityl, stearyl, and oleyl groups.

Examples of the fatty acid esters include alkyl oleates, alkyl stearates, alkyl linoleates, and alkyl palmitates. Alkyl oleates (e.g., methyl oleate, ethyl oleate, 2-ethylhexyl oleate, isopropyl oleate, octyl oleate) are preferred among these. In this case, the amount of alkyl oleates based on 100% by mass of the amount of fatty acid esters is preferably 80% by mass or more.

Other examples of the fatty acid esters include fatty acid monoesters or diesters formed from fatty acids (e.g., oleic acid, stearic acid, linoleic acid, palmitic acid) and alcohols (e.g., ethylene glycol, glycerol, trimethylolpropane, pentaerythritol, erythritol, xylitol, sorbitol, dulcitol, mannitol, inositol). Oleic acid monoesters are preferred among these. In this case, the amount of oleic acid monoesters based on 100% by mass of the combined amount of fatty acid monoesters and fatty acid diesters is preferably 80% by mass or more.

Phosphoric acid esters can be suitably used as ester plasticizers.

Preferred phosphoric acid esters include C12-C30 compounds, among which C12-C30 trialkyl phosphates are suitable. Here, the number of carbon atoms of the trialkyl phosphates means the total number of carbon atoms in the three alkyl groups. The three alkyl groups may be the same or different groups. Examples of the alkyl groups include linear or branched alkyl groups which may contain a heteroatom such as an oxygen atom or may be substituted with a halogen atom such as fluorine, chlorine, bromine, or iodine.

Other examples of the phosphoric acid esters include known phosphoric acid ester plasticizers such as: mono-, di-, or triesters of phosphoric acid with C1-C12 monoalcohols or their (poly)oxyalkylene adducts; and compounds obtained by substituting one or two alkyl groups of the aforementioned trialkyl phosphoates with phenyl group(s). Specific examples include tris(2-ethylhexyl)phosphate, trimethyl phosphate, triethyl phosphate, tributyl phosphate, trioctyl phosphate, triphenyl phosphate, tricresyl phosphate, trixylenyl phosphate, cresyl diphenyl phosphate, 2-ethylhexyl diphenyl phosphate, and tris(2-butoxyethyl)phosphate.

Examples of solid resins include resins which are solid at 25° C. such as terpene resins (including rosin resins), styrene resins, C5 resins, C9 resins, C5/C9 resins, coumarone-indene resins (including resins based on coumarone or indene alone), olefin resins, urethane resins, acrylic resins, p-t-butylphenol acetylene resins, and dicyclopentadiene resins (DCPD resins). These resins may be hydrogenated. These may be used singly or in admixtures of two or more. Moreover, the resins themselves may be copolymers of monomer components of different origins.

The solid resins may be commercially available from, for example, Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JXTG Nippon Oil & Energy Corporation, Arakawa Chemical Industries, Ltd., Taoka Chemical Co., Ltd., etc.

The softening point of the solid resins is preferably 30° C. or higher, more preferably 60° C. or higher, still more preferably 80° C. or higher, but is preferably 200° C. or lower, more preferably 160° C. or lower, still more preferably 140° C. or lower, particularly preferably 120° C. or lower. When the softening point is within the range indicated above, the advantageous effect tends to be more suitably achieved.

Herein, the softening point of the resins is determined in accordance with JIS K 6220-1:2001 using a ring and ball softening point measuring apparatus and defined as the temperature at which the ball drops down.

The terpene resins may be any resin that contains a unit derived from a terpene compound, and examples include polyterpenes (resins obtained by polymerization of terpene compounds), terpene aromatic resins (resins obtained by copolymerization of terpene compounds and aromatic compounds), and aromatic modified terpene resins (resins obtained by modification of terpene resins with aromatic compounds).

The terpene compounds refer to hydrocarbons having a composition represented by $(C_5H_8)_n$ or oxygen-containing derivatives thereof, each of which has a terpene backbone and is classified as, for example, a monoterpene ($C_{10}H_{16}$), sesquiterpene ($C_{15}H_{24}$), or diterpene ($C_{20}H_{32}$). Examples of the terpene compounds include α-pinene, β-pinene, dipentene, limonene, myrcene, allocimene, ocimene, a-phellandrene, a-terpinene, γ-terpinene, terpinolene, 1,8-cineole, 1,4-cineole, α-terpineol, β-terpineol, and γ-terpineol. Other examples of the terpene compounds include resin acids (rosin acids) such as abietic acid, neoabietic acid, palustric acid, levopimaric acid, pimaric acid, and isopimaric acid. In other words, the terpene resins include rosin resins formed mainly of rosin acids produced by processing pine resin. Here, examples of the rosin resins include natural rosin resins (polymerized rosins) such as gum rosins, wood rosins, and tall oil rosins; modified rosin resins such as maleic acid-modified rosin resins and rosin-modified phenol resins; rosin esters such as rosin glycerol esters; and disproportionated rosin resins obtained by disproportionation of rosin resins.

The aromatic compounds may be any compound having an aromatic ring. Examples include phenol compounds such as phenol, alkylphenols, alkoxyphenols, and unsaturated hydrocarbon group-containing phenols; naphthol compounds such as naphthol, alkylnaphthols, alkoxynaphthols, and unsaturated hydrocarbon group-containing naphthols; and styrene and styrene derivatives such as alkylstyrenes, alkoxystyrenes, and unsaturated hydrocarbon group-containing styrenes. Styrene is preferred among these.

The styrene resins refer to polymers formed from styrenic monomers as structural monomers, and examples include polymers produced by polymerization of styrenic monomers as main components (at least 50% by mass, preferably at least 80% by mass). Specific examples include homopolymers produced by polymerization of single styrenic monomers (e.g., styrene, o-methylstyrene, m-methylstyrene, p-methylstyrene, a-methylstyrene, p-methoxystyrene, p-tert-butylstyrene, p-phenylstyrene, o-chlorostyrene, m-chlorostyrene, p-chlorostyrene), copolymers produced by copolymerization of two or more styrenic monomers, and copolymers of styrenic monomers with additional monomers copolymerizable therewith.

Examples of the additional monomers include acrylonitriles such as acrylonitrile and methacrylonitrile; unsaturated carboxylic acids such as acrylic and methacrylic acid; unsaturated carboxylic acid esters such as methyl acrylate and methyl methacrylate; dienes such as chloroprene, butadiene, and isoprene; olefins such as 1-butene and 1-pentene;

and α,β-unsaturated carboxylic acids and acid anhydrides thereof such as maleic anhydride.

In particular, α-methylstyrene resins (e.g., α-methylstyrene homopolymers, copolymers of a-methylstyrene and styrene) are preferred, and copolymers of a-methylstyrene and styrene are more preferred.

The liquid resins may be resins having a structure similar to that of the above-described solid resins and also having a low softening point. Examples include resins which are liquid at 25° C. such as terpene resins (including rosin resins), styrene resins, C5 resins, C9 resins, C5/C9 resins, coumarone-indene resins (including resins based on coumarone or indene alone), olefin resins, urethane resins, acrylic resins, p-t-butylphenol acetylene resins, and dicyclopentadiene resins (DCPD resins). These resins may be hydrogenated. These may be used singly or in admixtures of two or more. Moreover, the resins themselves may be copolymers of monomer components of different origins.

Still other examples of the liquid resins include liquid (meaning liquid at 25° C., hereinafter the same) farnesene polymers such as liquid farnesene homopolymers, liquid farnesene-styrene copolymers, liquid farnesene-butadiene copolymers, liquid farnesene-styrene-butadiene copolymers, liquid farnesene-isoprene copolymers, and liquid farnesene-styrene-isoprene copolymers; liquid myrcene polymers such as liquid myrcene homopolymers, liquid myrcene-styrene copolymers, liquid myrcene-butadiene copolymers, liquid myrcene-styrene-butadiene copolymers, liquid myrcene-isoprene copolymers, and liquid myrcene-styrene-isoprene copolymers; liquid diene polymers such as liquid styrene-butadiene copolymers (liquid SBR), liquid polybutadiene polymers (liquid BR), liquid polyisoprene polymers (liquid IR), liquid styrene-isoprene copolymers (liquid SIR), liquid styrene-butadiene-styrene block copolymers (liquid SBS block polymers), and liquid styrene-isoprene-styrene block copolymers (liquid SIS block polymers); liquid olefin polymers containing an olefin resin (e.g., polyethylene, polypropylene) as a hard segment (hard phase) and a rubber component as a soft segment (soft phase); and liquid ester polymers containing a polyester as a hard segment and a polyether, polyester, or the like as a soft segment. These may be modified at the chain end or backbone by a polar group. These may be used alone or in combinations of two or more.

The liquid resins may be commercially available from, for example, Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JXTG Nippon Oil & Energy Corporation, Arakawa Chemical Industries, Ltd., Taoka Chemical Co., Ltd., Sartomer, Kuraray Co., Ltd., etc.

In addition to the above-mentioned components, the rubber composition may contain additives commonly used in the tire industry, such as vulcanizing agents other than sulfur (e.g., organic crosslinking agents, organic peroxides), calcium carbonate, mica such as sericite, aluminum hydroxide, magnesium oxide, magnesium hydroxide, clay, talc, alumina, and titanium oxide. The amounts of such components are each preferably 0.1 parts by mass or more but is preferably 200 parts by mass or less, per 100 parts by mass of the polymer component (preferably, rubber component) content.

Examples of usable organic peroxides include benzoyl peroxide, dicumyl peroxide, di-t-butyl peroxide, t-butyl cumyl peroxide, methyl ethyl ketone peroxide, cumene hydroperoxide, 2,5-dimethyl-2,5-di(t-butylperoxy)hexane, 2,5-dimethyl-2,5-di(benzoylperoxy)hexane, 2,5-dimethyl-2,5-di(t-butylperoxy)hexyne-3, and 1,3-bis(t-butylperoxypropyl)benzene. These may be used alone or in combinations of two or more.

The rubber composition may be prepared, for example, by kneading the above-described components using a rubber kneading machine such as an open roll mill or a Banbury mixer, and then vulcanizing the kneaded mixture.

The kneading conditions are as follows. In a base kneading step of kneading additives other than crosslinking agents (vulcanizing agents) and vulcanization accelerators, the kneading temperature is usually 100 to 180° C., preferably 120 to 170° C. In a final kneading step of kneading vulcanizing agents and vulcanization accelerators, the kneading temperature is usually 120° C. or lower, preferably 80 to 110° C. Then, the rubber composition obtained after kneading vulcanizing agents and vulcanization accelerators is usually vulcanized by, for example, press vulcanization. The vulcanization temperature is usually 140 to 190° C., preferably 150 to 185° C.

The rubber composition may be used (as a rubber composition for tires) in tire components, including, for example, treads (cap treads), sidewalls, base treads, undertreads, clinches, bead apexes, breaker cushion rubbers, rubbers for carcass cord topping, insulations, chafers, and innerliners, and side reinforcement layers of run-flat tires. Among these, the rubber composition is suitable for use in treads. When the rubber composition is used in treads, it may be used either only in a cap tread or only in a base tread, but is preferably used in both treads.

(Rubber Composition 2)

The rubber composition 1 has been described above. Next, a rubber composition 2 is described.

The rubber composition 2 of the present disclosure reversibly satisfies the relationship (I) below with respect to the temperature dependence of contact angles of water at two temperatures differing by at least 10° C. Thus, the rubber composition 2 can reversibly vary tire performance in response to changes in temperature. The rubber composition 1, which contains the above-described polymer composite, inevitably reversibly satisfies relationship (I) with respect to the temperature dependence of contact angles of water at two temperatures differing by at least 10° C.

Although the rubber composition 2 is described below, other features not described for the rubber composition 2 are all similar to those described for the rubber composition 1. The same applies to the suitable embodiments.

$$\text{Temperature dependence of contact angles: (Contact angle at lower temperature)/(Contact angle at higher temperature)} \times 100 \leq 90 \qquad \text{(I)}$$

The reason for this advantageous effect is not exactly clear, but is believed to be as follows.

Reversibly satisfying relationship (I) means that the hydrophilicity of the rubber composition reversibly changes with changes in temperature. As the hydrophilicity of the rubber composition reversibly changes with changes in temperature, the rubber composition can reversibly vary tire performance in response to changes in temperature.

As described above, the present disclosure solves the problem (purpose) of reversibly varying tire performance in response to changes in temperature by formulating a rubber composition that satisfies the parameter of relationship (I). In other words, the parameter does not define the problem (purpose), and the problem herein is to reversibly vary tire performance in response to changes in temperature. In order to solve this problem, the rubber composition has been formulated to satisfy the parameter of relationship (I). Thus, satisfying the parameter of relationship (I) is an essential structural element.

The rubber composition reversibly satisfies the following relationship (I) with respect to the temperature dependence of contact angles of water at two temperatures differing by at least 10° C.:

Temperature dependence of contact angles: (Contact angle at lower temperature)/(Contact angle at higher temperature)×100≤90. (I)

Herein, the contact angle of water of the rubber composition is measured as described in EXAMPLES. Herein, the term "contact angle of water of the rubber composition" refers to the contact angle of water of the vulcanized rubber composition.

The two temperatures differing by at least 10° C. are not limited as long as the temperatures fall within the service temperature range of a tire, and preferably fall within a range of −80° C. to 80° C. The lower limit of the temperature range is more preferably −50° C. or higher, still more preferably −20° C. or higher, while the upper limit of the temperature range is more preferably 80° C. or lower, still more preferably 50° C. or lower. The two temperatures depend on the chemical structure of the temperature-responsive polymer. This is because the critical solution temperature of the temperature-responsive polymer depends on the chemical structure of the temperature-responsive polymer.

For example, the two temperatures differing by at least 10° C. may be 25° C. and 40° C.

The left-hand side of relationship (I) is not more than 90.

In general, a rubber composition has a constant contact angle of water at any temperature. In contrast, the present rubber composition exhibits hydrophobicity at one temperature but exhibits more hydrophilicity at a temperature lower by at least 10° C. than the one temperature as the contact angle is reduced by 90 percent or more.

The left-hand side of relationship (I) is preferably not more than 87, more preferably not more than 85, still more preferably not more than 84, particularly preferably not more than 83, most preferably not more than 82, further preferably not more than 81, further preferably not more than 80, further preferably not more than 78, further preferably not more than 76, further preferably not more than 74, further preferably not more than 73. The lower limit is not limited, but is preferably not less than 5, more preferably not less than 10, still more preferably not less than 30, particularly preferably not less than 50, most preferably not less than 70. When the left-hand side is within the range indicated above, the advantageous effect tends to be better achieved.

The contact angle (°) of water at 25° C. of the (vulcanized) rubber composition is preferably 84 or smaller, more preferably 83 or smaller, still more preferably 82 or smaller, particularly preferably 81 or smaller, most preferably 78 or smaller, further preferably 77 or smaller, further preferably 76 or smaller, further preferably 75 or smaller, further preferably 74 or smaller, further preferably 73 or smaller, further preferably 72 or smaller. The lower limit is not limited, but is preferably 5 or larger, more preferably 10 or larger, still more preferably 30 or larger, particularly preferably 50 or larger, most preferably 70 or larger. When the contact angle is within the range indicated above, the advantageous effect tends to be better achieved.

Here, as is clear from the above description, the above-described polymer composite may be compounded in a rubber composition to adjust the left-hand side of relationship (I) and the contact angle of water at 25° C. of the (vulcanized) rubber composition within the preferred ranges described above.

Moreover, as is clear from the above description, the left-hand side of relationship (I) and the contact angle of water at 25° C. of the (vulcanized) rubber composition may be appropriately controlled by the type of the group that changes hydrophilicity with changes in temperature (temperature-responsive polymer) in the polymer composite compounded in the rubber composition, and the amount of the polymer composite (the amount of the group that changes hydrophilicity with changes in temperature (temperature-responsive polymer)) compounded in the rubber composition. For example, the left-hand side of relationship (I) and the contact angle of water at 25° C. of the (vulcanized) rubber composition tend to be reduced by increasing the amount of the polymer composite (the amount of the group that changes hydrophilicity with changes in temperature (temperature-responsive polymer)) compounded in the rubber composition.

Here, if a rubber composition is merely compounded with the temperature-responsive polymer, the temperature-responsive polymer may run off the rubber composition, e.g., by dissolving in water. Thus, the rubber composition cannot reversibly satisfy relationship (I).

(Tire)

The tire of the present disclosure can be produced from the above-described rubber composition (rubber composition 1 or rubber composition 2) by usual methods. Specifically, the unvulcanized rubber composition compounded with additives as needed may be extruded into the shape of a tire component (in particular a tread (cap tread)), formed in a usual manner on a tire building machine, and then assembled with other tire components to build an unvulcanized tire, followed by heating and pressurizing in a vulcanizer to produce a tire.

The tire may be any tire, including, for example, pneumatic tires, solid tires, and airless tires. Pneumatic tires are preferred among these.

The tire is suitable for use as a tire for passenger vehicles, large passenger vehicles, large SUVs, trucks and buses, or two-wheeled vehicles, or as a racing tire, a winter tire (studless winter tire, snow tire, studded tire), an all-season tire, a run-flat tire, an aircraft tire, a mining tire, etc.

EXAMPLES

The present disclosure is specifically described with reference to, but not limited to, examples.

Here, the chemicals used in the synthesis or polymerization were purified by usual methods, if needed.

Moreover, the methods for evaluation of the prepared polymers are collectively described below.

(Measurement of Weight Average Molecular Weight (Mw))

The weight average molecular weight (Mw) of the polymers was determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards.

(Structural Identification of Polymer)

The structural identification of the polymers was performed using a NMR instrument of JNM-ECA series available from JEOL Ltd. Here, the cis content was measured by infrared absorption spectrometry.

(Determination of Left-Hand Side of Relationship (III) (Ratio of Remaining Reactant))

In the determination of the left-hand side of relationship (III), a person skilled in the art can easily determine the reaction rate of the reactant using a general instrumental analysis. Specifically, the reaction rate of the reactant can be determined from the peak intensity of the monomer of the reactant and the peak intensity of the polymer of the reactant using an instrumental analysis such as $^1$H-NMR analysis. For example, when the reactant is NIPAM, the hydrogen atom bound to the carbon adjacent to the nitrogen atom of the monomer appears at 4.18 ppm, but as the reaction proceeds, the hydrogen atom bound to the carbon adjacent to the nitrogen atom of the polymer appears at 4.00 ppm. The ratio of the remaining reactant can be calculated from these peak intensities as follows:

Ratio of remaining reactant: (Peak intensity of reactant before stirring)/[(Peak intensity of reactant before stirring)+(Peak intensity of reactant after stirring)]×100≤50. (III)

Here, the peak intensities are relative to an internal standard at a fixed concentration. Herein, tetramethylsilane (TMS) was used as the internal standard.

(Determination of Left-Hand Side of Relationship (IV) (Ratio of Remaining Conjugated Diene Portion))

In the determination of the left-hand side of relationship (IV), a person skilled in the art can easily determine the reaction rate of the conjugated diene using a general instrumental analysis. Specifically, the reaction rate of the reactant can be determined from the peak intensity of the polymer before reaction and the peak intensity of the polymer after reaction using an instrumental analysis such as $^1$H-NMR analysis. For example, when the reactant is BR, the hydrogen atom bound to the carbon-carbon double bond of the unreacted product appears at 5.38 ppm, but as the reaction proceeds, the peak intensity of this peak approaches 0. The ratio of the remaining conjugated diene portion can be calculated from these peak intensities as follows:

Ratio of remaining conjugated diene portion: (Peak intensity of conjugated diene-derived double bonds before stirring)/[(Peak intensity of conjugated diene-derived double bonds before stirring)+(Peak intensity of conjugated diene-derived double bonds after stirring)]×100≤99. (IV)

Here, the peak intensities are relative to an internal standard at a fixed concentration. Herein, tetramethylsilane (TMS) was used as the internal standard.

<Production Example of Polymer>

(Polymerization of Polymer A)

An amount of 1500 mL of n-hexane, 25 g of styrene, 75 g of 1,3-butadiene, 0.2 mmol of tetramethylethylenediamine, and 0.24 mmol of n-butyllithium were added to a sufficiently nitrogen-purged heat-resistant vessel, followed by stirring at 0° C. for 48 hours. Subsequently, the reaction was terminated by adding alcohol. Then, 24 mL of a 1 mmol/L solution of BHT in ethanol was added to the reaction solution. A 10 mL fraction of the polymerization liquid was collected, precipitated with 40 mL of ethanol, and then dried to obtain polymer A. The polymer (SBR) had a weight average molecular weight of 460,000 and a styrene content of 25% by mass, and the yield was 99%.

(Polymerization of Polymer B)

Preparation of Catalyst Solution B

An amount of 350 mL of cyclohexane and 35 g of a butadiene monomer were added to a dried and nitrogen-purged 1 L pressure-resistant stainless steel vessel. Thereto were added 54 mL of a 20 vol % solution of neodymium versatate in cyclohexane and then 130 mL of a solution of PMAO in toluene, and they were stirred for 30 minutes. Subsequently, 30 mL of a 1 M solution of DAIBAH in hexane was added and then stirred for 30 minutes. Subsequently, 15 mL of a 1 M solution of 2-chloro-2-methylpropane in cyclohexane was added and then stirred for 30 minutes to give catalyst solution A.

Polymerization of Polymer B

An amount of 2000 mL of cyclohexane and 100 g of butadiene were added to a dried and nitrogen-purged 3 L pressure-resistant stainless steel vessel, and then 10 mL of a 1 mol/L solution of TIBA in normalhexane was added and stirred for 5 minutes. After confirming that the solution was transparent, 30 mL of catalyst solution A was added to perform a polymerization reaction at 80° C. for 3 hours. After the 3 hours, 50 mL of a 1 M isopropanol/THF solution as a reaction-terminating agent was dropwise added to terminate the reaction. A 10 mL fraction of the polymerization liquid was collected, precipitated with 40 mL of ethanol, and then dried to obtain polymer B. The polymer (BR) had a weight average molecular weight of 800,000 and a cis content of 98% by mass, and the yield was 99%.

(Polymerization of Polymer C)

An amount of 1800 mL of toluene and 100 g (880 mmol) of an isopropylacrylamide (NIPAM) monomer were added to a dried and nitrogen-purged 3 L glass vessel and then stirred at room temperature until a homogeneous solution was obtained. Subsequently, 16.7 mmol (2 mol % of the NIPAM units) of azobisisobutyronitrile (AIBN) was added and then stirred for 5 hours while confirming precipitation of a polymer at 70° C. to 110° C. The reaction solution was cooled to room temperature, and 200 mL of THF was added to give a homogeneous solution, followed by distillation of the solvent. The resulting product was dried under reduced pressure at 80° C./1 mmHg to a loss on drying of 0.5% or less to prepare poly(N-isopropylacrylamide) (PNIPAM). The reaction rate was 98% as determined from the protons before reaction (NIPAM) and after reaction (PNIPAM) by $^1$H-NMR.

(Comparative Example 1) Production of Polymer Composite 1

The polymer B was pressed into a 2 mm-thick sheet.

(Comparative Example 2) Production of Polymer Composite 2

The polymerization solution of polymer B and polymer C were mixed at a solid ratio of 100/10. Subsequently, 200 mL of THF was added to the mixture to give a homogeneous solution, followed by distillation of the solvent. The resulting product was dried under reduced pressure at 80° C./1 mmHg to a loss on drying of 0.5% or less and then pressed into a 2 mm-thick sheet.

(Comparative Example 3) Production of Polymer Composite 3

The same procedure as in Comparative Example 2 was followed, except that the solid ratio was 100/100.

(Comparative Example 4) Production of Polymer Composite 4

The same procedure as in Comparative Example 1 was followed, except that the polymer was replaced with polymer A.

(Comparative Example 5) Production of Polymer Composite 5

The same procedure as in Comparative Example 2 was followed, except that the polymer was replaced with polymer A and the solid ratio was 100/10.

(Comparative Example 6) Production of Polymer Composite 6

The same procedure as in Comparative Example 2 was followed, except that the polymer was replaced with polymer A and the solid ratio was 100/100.

(Comparative Example 7) Production of Polymer Composite 7

The polymerization solution of polymer B (equivalent to 100 g of the solids) and 33 mmol of AIBN were added, and then 200 mL of THF was added, followed by stirring at 70° C. to 110° C. for 5 hours. The solvent was distilled off, and the resulting product was dried under reduced pressure at 80° C./1 mmHg to a loss on drying of 0.5% or less and then pressed into a 2 mm-thick sheet.

(Comparative Example 8) Production of Polymer Composite 8

The same procedure as in Comparative Example 7 was followed, except that the polymer was replaced with polymer A.

(Comparative Example 9) Production of Polymer Composite 9

The polymerization solution of polymer B and isopropylacrylamide (NIPAM) were mixed at a solid ratio of 100/100. Subsequently, 200 mL of THF was added to the mixture to give a homogeneous solution, followed by stirring at 70° C. to 110° C. for 5 hours. The solvent was distilled off, and the resulting product was dried under reduced pressure at 80° C./1 mmHg to a loss on drying of 0.5% or less and then pressed into a 2 mm-thick sheet.

(Comparative Example 10) Production of Polymer Composite 10

The same procedure as in Comparative Example 9 was followed, except that the polymer was replaced with polymer A.

(Example 1) Production of Polymer Composite 11

An amount of 10 g of isopropylacrylamide (NIPAM) and 1.7 mmol of azobisisobutyronitrile (AIBN) were added to the polymerization solution of polymer B (equivalent to 100 g of the solids, solvent: cyclohexane), and they were stirred at 70° C. to 110° C. for 5 hours. The solvent was distilled off, and the resulting product was dried under reduced pressure at 80° C./1 mmHg to a loss on drying of 0.5% or less and then pressed into a 2 mm-thick sheet. The reaction rate was 99% as determined from the protons before reaction (NIPAM) and after reaction (PNIPAM) by $^1$H-NMR. Moreover, the left-hand side value of relationship (III) was 1, and the left-hand side value of relationship (IV) was 97.

(Example 2) Production of Polymer Composite 12

The same procedure as in Example 1 was followed, except that the amount of NIPAM charged was changed to 100 g, and the amount of AIBN charged was changed to 16.7 mmol. The reaction rate was 99% as determined from the protons before reaction (NIPAM) and after reaction (PNIPAM) by $^1$H-NMR. Moreover, the left-hand side value of relationship (III) was 2, and the left-hand side value of relationship (IV) was 96.

(Example 3) Production of Polymer Composite 13

The same procedure as in Example 1 was followed, except that the polymer was replaced with polymer A, and the solvent was replaced with n-hexane.

The reaction rate was 99% as determined from the protons before reaction (NIPAM) and after reaction (PNIPAM) by $^1$H-NMR. Moreover, the left-hand side value of relationship (III) was 24, and the left-hand side value of relationship (IV) was 96.

(Example 4) Production of Polymer Composite 14

The same procedure as in Example 1 was followed, except that the polymer was replaced with polymer A, the amount of NIPAM charged was changed to 100 g, the amount of AIBN charged was changed to 16.7 mmol, and the solvent was replaced with n-hexane. The reaction rate was 99% as determined from the protons before reaction (NIPAM) and after reaction (PNIPAM) by $^1$H-NMR. Moreover, the left-hand side value of relationship (III) was 25, and the left-hand side value of relationship (IV) was 95.

(Example 5) Production of Polymer Composite 15

The same procedure as in Example 1 was followed, except that the amount of NIPAM charged was changed to 50 g, and the amount of AIBN charged was changed to 8.35 mmol.

The reaction rate was 99% as determined from the protons before reaction (NIPAM) and after reaction (PNIPAM) by $^1$H-NMR. Moreover, the left-hand side value of relationship (III) was 1, and the left-hand side value of relationship (IV) was 97.

(Example 6) Production of Polymer Composite 16

The same procedure as in Example 1 was followed, except that the polymer was replaced with polymer A, the amount of NIPAM charged was changed to 50 g, the amount of AIBN charged was changed to 8.35 mmol, and the solvent was replaced with n-hexane. The reaction rate was 99% as determined from the protons before reaction (NIPAM) and after reaction (PNIPAM) by $^1$H-NMR. Moreover, the left-hand side value of relationship (III) was 24, and the left-hand side value of relationship (IV) was 96.

(Example 7) Production of Polymer Composite 17

The same procedure as in Example 1 was followed, except that N-n-propylacrylamide (NNPAM) was used instead of NIPAM. The reaction rate was 99% as determined from the protons before reaction (NNPAM) and after reaction (PNNPAM) by $^1$H-NMR. Moreover, the left-hand side value of relationship (III) was 1, and the left-hand side value of relationship (IV) was 97.

(Example 8) Production of Polymer Composite 18

The same procedure as in Example 1 was followed, except that N—N-diethylacrylamide (NDEAM) was used instead of NIPAM. The reaction rate was 99% as determined from the protons before reaction (NDEPAM) and after reaction (PNDEPAM) by $^{1}$H-NMR. Moreover, the left-hand side value of relationship (III) was 1, and the left-hand side value of relationship (IV) was 97.

(Example 9) Production of Polymer Composite 19

The same procedure as in Example 1 was followed, except that N-isopropyl,N-methylacrylamide (NMNIPAM) was used instead of NIPAM. The reaction rate was 99% as determined from the protons before reaction (NMNIPAM) and after reaction (PNMNIPAM) by $^{1}$H-NMR. Moreover, the left-hand side value of relationship (III) was 1, and the left-hand side value of relationship (IV) was 97.

(Example 10) Production of Polymer Composite 20

The same procedure as in Example 1 was followed, except that the polymer was replaced with natural rubber (weight average molecular weight: 600,000), and the solvent was replaced with n-hexane.

The reaction rate was 99% as determined from the protons before reaction (NIPAM) and after reaction (PNIPAM) by $^{1}$H-NMR. Moreover, the left-hand side value of relationship (III) was 24, and the left-hand side value of relationship (IV) was 95.

(Example 11) Production of Polymer Composite 21

The same procedure as in Example 1 was followed, except that the polymer was replaced with natural rubber (weight average molecular weight: 600,000), the amount of NIPAM charged was changed to 100 g, the amount of AIBN charged was changed to 16.7 mmol, and the solvent was replaced with n-hexane. The reaction rate was 99% as determined from the protons before reaction (NIPAM) and after reaction (PNIPAM) by $^{1}$H-NMR. Moreover, the left-hand side value of relationship (III) was 24, and the left-hand side value of relationship (IV) was 95.

The prepared polymer composites were evaluated as described below. Tables 2 and 3 show the results.

(Measurement of Contact Angle of Water of Polymer Composite)

The contact angle (°) of water of the 2 mm-thick polymer composite sheets was measured.

Specifically, each 2 mm-thick polymer composite sheet was maintained at a measurement temperature for 10 minutes, then 20 μL of a water droplet was dropped on the surface of the sheet, and the contact angle of the droplet after 20 seconds was measured using a contact angle meter.

Here, the measurements shown in Table 2 were firstly performed at a measurement temperature of 25° C. and then at a measurement temperature of 40° C. These measurements were used as the first measurements. After the first measurements, the surface (measurement surface) of the measured polymer composite sheet was wet-wiped with water-soaked paper and subsequently dry-wiped with dry paper. Then, after the dry-wiped polymer composite sheet was cooled to room temperature, second measurements were performed at a measurement temperature of 25° C. and then at a measurement temperature of 40° C. These measurements were used as the second measurements.

Moreover, the measurements shown in Table 3 were firstly performed at a measurement temperature of 20° C., then at a measurement temperature of 30° C., and then at a measurement temperature of 40° C. These measurements were used as the first measurements. After the first measurements, the surface (measurement surface) of the measured polymer composite sheet was wet-wiped with water-soaked paper and subsequently dry-wiped with dry paper. Then, after the dry-wiped polymer composite sheet was cooled to room temperature, second measurements were performed at a measurement temperature of 20° C., then at a measurement temperature of 30° C., and then at a measurement temperature of 40° C. These measurements were used as the second measurements.

Tables 2 and 3 show the results.

TABLE 2

| | | Comparative Example | | | | | | | | | |
|---|---|---|---|---|---|---|---|---|---|---|---|
| | | 1 | 2 | 3 | 4 | 5 | 6 | 7 | 8 | 9 | 10 |
| | | Polymer composite | | | | | | | | | |
| | | 1 | 2 | 3 | 4 | 5 | 6 | 7 | 8 | 9 | 10 |
| Conjugated diene | Type | Polymer B | Polymer B | Polymer B | Polymer A | Polymer A | Polymer A | Polymer B | Polymer A | Polymer B | Polymer A |
| | Molecular weight | 800,000 | 800,000 | 800,000 | 460,000 | 460,000 | 460,000 | 800,000 | 460,000 | 800,000 | 460,000 |
| | Amount | 100 | 100 | 100 | 100 | 100 | 100 | 100 | 100 | 100 | 100 |
| Reactant | Type | Polymer C | Polymer C | Polymer C | Polymer C | Polymer C | Polymer C | Polymer C | Polymer C | NIPAM | NIPAM |
| | Design molecular weight | 3000 | 3000 | 3000 | 3000 | 3000 | 3000 | 3000 | 3000 | 113 | 113 |
| | Amount | 0 | 10 | 100 | 0 | 10 | 100 | 0 | 0 | 100 | 100 |
| Mixing method | Radical | Absent | Absent | Absent | Absent | Absent | Absent | Present | Present | Absent | Absent |
| Sheet condition | | Homo-geneous | Sepa-rated | Sepa-rated | Homo-geneous | Sepa-rated | Sepa-rated | Homo-geneous | Homo-geneous | Sepa-rated | Sepa-rated |
| Contact angle | 40° C. | 96 | 62 | 58 | 98 | 62 | 61 | 96 | 97 | 52 | 58 |
| First | 25° C. | 92 | 56 | 55 | 96 | 54 | 53 | 93 | 94 | 51 | 56 |
| | Change in contact angle | 96 | 90 | 95 | 98 | 87 | 87 | 97 | 97 | 98 | 97 |

TABLE 2-continued

| | | Comparative Example 1 | 2 | 3 | 4 | 5 | 6 | 7 | 8 | 9 | 10 |
|---|---|---|---|---|---|---|---|---|---|---|---|
| | | Polymer composite 1 | 2 | 3 | 4 | 5 | 6 | 7 | 8 | 9 | 10 |
| Contact angle | 40° C. | 96 | 86 | 86 | 98 | 89 | 89 | 96 | 95 | 86 | 87 |
| Second | 25° C. | 92 | 85 | 84 | 96 | 86 | 86 | 93 | 94 | 85 | 85 |
| | Change in contact angle | 96 | 99 | 98 | 98 | 97 | 97 | 97 | 99 | 99 | 98 |

TABLE 3

| | | Example 1 | 2 | 3 | 4 | 5 | 6 |
|---|---|---|---|---|---|---|---|
| | | Polymer composite 11 | 12 | 13 | 14 | 15 | 16 |
| Conjugated diene | Type | Polymer B | Polymer B | Polymer A | Polymer A | Polymer B | Polymer A |
| | Molecular weight | 800,000 | 800,000 | 460,000 | 460,000 | 800,000 | 460,000 |
| | Amount | 100 | 100 | 100 | 100 | 100 | 100 |
| Reactant | Type | NIPAM | NIPAM | NIPAM | NIPAM | NIPAM | NIPAM |
| | Design molecular weight | 3000 | 3000 | 3000 | 3000 | 3000 | 3000 |
| | Amount | 10 | 100 | 10 | 100 | 50 | 50 |
| Mixing method | Radical | Present | Present | Present | Present | Present | Present |
| Sheet condition | | Homo-geneous | Homo-geneous | Homo-geneous | Homo-geneous | Homo-geneous | Homo-geneous |
| Contact angle | 40° C. | 92 | 89 | 95 | 95 | 91 | 96 |
| | 30° C. | 74 | 65 | 71 | 65 | 70 | 67 |
| First | 20° C. | 74 | 65 | 71 | 65 | 70 | 67 |
| | Change in contact angle | 80 | 73 | 75 | 68 | 77 | 70 |
| Contact angle | 40° C. | 91 | 90 | 96 | 98 | 93 | 97 |
| | 30° C. | 73 | 64 | 71 | 65 | 72 | 68 |
| Second | 20° C. | 73 | 64 | 71 | 65 | 72 | 68 |
| | Change in contact angle | 80 | 71 | 74 | 66 | 77 | 70 |

| | | Example 7 | 8 | 9 | 10 | 11 |
|---|---|---|---|---|---|---|
| | | Polymer composite 17 | 18 | 19 | 20 | 21 |
| Conjugated diene | Type | Polymer B | Polymer B | Polymer B | NR | NR |
| | Molecular weight | 800,000 | 800,000 | 800,000 | 600,000 | 600,000 |
| | Amount | 100 | 100 | 100 | 100 | 100 |
| Reactant | Type | NNPAM | NDEAM | NMNIPAM | NIPAM | NIPAM |
| | Design molecular weight | 3000 | 3000 | 3000 | 3000 | 3000 |
| | Amount | 10 | 10 | 10 | 10 | 100 |
| Mixing method | Radical | Present | Present | Present | Present | Present |
| Sheet condition | | Homo-geneous | Homo-geneous | Homo-geneous | Homo-geneous | Homo-geneous |
| Contact angle | 40° C. | 98 | 98 | 99 | 91 | 90 |
| | 30° C. | 98 | 94 | 99 | 80 | 72 |
| First | 20° C. | 87 | 88 | 89 | 80 | 72 |
| | Change in contact angle | 89 | 90 | 90 | 88 | 80 |

TABLE 3-continued

| | | | | | | |
|---|---|---|---|---|---|---|
| Contact angle | 40° C. | 98 | 98 | 99 | 91 | 90 |
| | 30° C. | 98 | 94 | 99 | 80 | 72 |
| Second | 20° C. | 88 | 88 | 89 | 80 | 72 |
| | Change in contact angle | 90 | 90 | 90 | 88 | 80 |

As shown in Tables 2 and 3, relationship (II) with respect to the temperature dependence of contact angles of water at two temperatures differing by at least 10° C. is reversibly satisfied by the polymer composites of the examples formed by stirring at least one conjugated diene polymer having a weight average molecular weight of 100,000 or more as determined by gel permeation chromatography, at least one radical generator, and at least one reactant having at least one heteroatom and at least one carbon-carbon double bond in at least one solvent selected from the group consisting of hydrocarbon solvents, aromatic solvents, and aprotic polar solvents at a temperature of at least 40° C. but not higher than 200° C.

It is shown that the polymer composites of the examples, which reversibly satisfy relationship (II) with respect to the temperature dependence of contact angles of water at two temperatures differing by at least 10° C., can reversibly vary tire performance in response to changes in temperature.

The FIGURE shows the contact angles of water of the polymer composites of Example 2 and Comparative Example 4 measured at varied temperatures.

As shown in the FIGURE, the polymer A (SBR) has a contact angle of water which remains constant without any change as the temperature changes. In contrast, it is shown that the polymer composite of the present disclosure has a contact angle of water which remains constant without any change at temperatures higher than 40° C. but decreases at temperatures of 40° C. or lower. Moreover, it was demonstrated that even when multiple measurements are similarly performed on the same sample at varied temperatures, the contact angle of water also remains constant without any change at temperatures higher than 40° C. but decreases at temperatures of 40° C. or lower. The results show that the polymer composite is bound to a group that changes hydrophilicity with changes in temperature (temperature-responsive polymer) and exhibits a similar temperature dependence of contact angles of water regardless of repeated changes in temperature.

Thus, it is shown that the polymer composite of the present disclosure reversibly satisfies relationship (II) with respect to the temperature dependence of contact angles of water at two temperatures differing by at least 10° C.

The chemicals used in the examples and comparative examples below are listed below.

Polymer A: the above-described polymer A

Polymer B: the above-described polymer B

Polymer composite 3: the above-described polymer composite 3

Polymer composite 6: the above-described polymer composite 6

Polymer composite 12: the above-described polymer composite 12

Polymer composite 14: the above-described polymer composite 14

NR: the above-described natural rubber

Polymer composite 21: the above-described polymer composite 21

Carbon black: N134 ($N_2SA$: 148 $m^2/g$, DBP: 123 ml/100 g) available from Cabot Japan K.K.

Silica: ULTRASIL VN3 ($N_2SA$: 175 $m^2/g$) available from Evonik Degussa

Silane coupling agent: Si69 (bis(3-triethoxysilylpropyl) tetrasulfide) available from Evonik Degussa Antioxidant: NOCRAC 6C (N-(1,3-dimethylbutyl)-N'-phenyl-p-phenylenediamine) available from Ouchi Shinko Chemical Industrial Co., Ltd.

Stearic acid: stearic acid available from NOF Corporation

Zinc oxide: zinc oxide #1 available from Mitsui Mining & Smelting Co., Ltd.

Sulfur: powdered sulfur available from Tsurumi Chemical Industry Co., Ltd.

Vulcanization accelerator (1): NOCCELER CZ (N-cyclohexyl-2-benzothiazolylsulfenamide) available from Ouchi Shinko Chemical Industrial Co., Ltd.

Vulcanization accelerator (2): NOCCELER D (1,3-diphenylguanidine) available from Ouchi Shinko Chemical Industrial Co., Ltd.

Examples and Comparative Examples

According to the formulation recipe shown in Table 4, the chemicals other than the sulfur and vulcanization accelerators were kneaded using a 1.7 L Banbury mixer (Kobe Steel, Ltd.) at 150° C. for 5 minutes to obtain a kneaded mixture. Then, the kneaded mixture was kneaded with the sulfur and vulcanization accelerators in an open roll mill at 80° C. for 5 minutes to obtain an unvulcanized rubber composition.

The unvulcanized rubber composition was press-vulcanized at 170° C. for 15 minutes to obtain a 2 mm-thick vulcanized rubber composition sheet.

Here, in Table 4, the conjugated diene polymer (rubber component) contained in each polymer composite is taken into account to control the rubber component content to 100 parts by mass.

The 2 mm-thick vulcanized rubber composition sheets prepared as above were used to measure the contact angle of water of the rubber compositions. Specifically, in the above "Measurement of contact angle of water of polymer composite", the 2 mm-thick vulcanized rubber composition sheets were used instead of the 2 mm-thick polymer composite sheets to measure the contact angle of water of the rubber compositions. Table 4 shows the results.

TABLE 4

| | Rubber composition | Comparative Example | | | | | Example | | | | | | | | |
|---|---|---|---|---|---|---|---|---|---|---|---|---|---|---|---|
| | | 11 | 12 | 13 | 14 | 15 | 12 | 13 | 14 | 15 | 16 | 17 | 18 | 19 | 20 |
| Amount (parts by mass) | SBR (Polymer A) | 100 | | | | | 80 | 80 | | | | | 40 | 40 | |
| | BR (Polymer B) | | 100 | | | | | | 80 | 80 | | | | | |
| | BR (Polymer composite 3) | | | 200 | | | | | | | | | | | |
| | SBR (Polymer composite 6) | | | | 200 | | | | | | | | | | |
| | BR (Polymer composite 12) | | | | | | 40 | | 40 | | 200 | | 120 | | |
| | SBR (Polymer composite 14) | | | | | | | 40 | | 40 | | 200 | | 120 | |
| | NR | | | | | 100 | | | | | | | | | |
| | NR (Polymer composite 21) | | | | | | | | | | | | | | 200 |
| | Carbon black | 5 | 5 | 5 | 5 | 5 | 5 | 5 | 5 | 5 | 5 | 5 | 5 | 5 | 5 |
| | Silica | 20 | 20 | 20 | 20 | 20 | 20 | 20 | 20 | 20 | 20 | 20 | 20 | 20 | 20 |
| | Silane coupling agent | 1.2 | 1.2 | 1.2 | 1.2 | 1.2 | 1.2 | 1.2 | 1.2 | 1.2 | 1.2 | 1.2 | 1.2 | 1.2 | 1.2 |
| | Antioxidant | 1 | 1 | 1 | 1 | 1 | 1 | 1 | 1 | 1 | 1 | 1 | 1 | 1 | 1 |
| | Stearic acid | 1 | 1 | 1 | 1 | 1 | 1 | 1 | 1 | 1 | 1 | 1 | 1 | 1 | 1 |
| | Zinc oxide | 1 | 1 | 1 | 1 | 1 | 1 | 1 | 1 | 1 | 1 | 1 | 1 | 1 | 1 |
| | Sulfur | 1 | 1 | 1 | 1 | 1 | 1 | 1 | 1 | 1 | 1 | 1 | 1 | 1 | 1 |
| | Vulcanization accelerator (1) | 1 | 1 | 1 | 1 | 1 | 1 | 1 | 1 | 1 | 1 | 1 | 1 | 1 | 1 |
| | Vulcanization accelerator (2) | 1 | 1 | 1 | 1 | 1 | 1 | 1 | 1 | 1 | 1 | 1 | 1 | 1 | 1 |
| Contact angle First | 40° C. | 103 | 103 | 74 | 75 | 96 | 98 | 98 | 99 | 99 | 98 | 99 | 96 | 96 | 95 |
| | 25° C. | 102 | 103 | 69 | 69 | 96 | 82 | 81 | 82 | 83 | 73 | 74 | 77 | 75 | 77 |
| | Change in contact angle | 99 | 100 | 93 | 92 | 100 | 84 | 83 | 83 | 84 | 74 | 75 | 80 | 78 | 81 |
| Contact angle Second | 40° C. | 101 | 102 | 98 | 99 | 96 | 99 | 99 | 100 | 100 | 98 | 99 | 96 | 96 | 95 |
| | 25° C. | 100 | 102 | 98 | 98 | 96 | 81 | 83 | 83 | 83 | 72 | 73 | 77 | 75 | 77 |
| | Change in contact angle | 99 | 100 | 100 | 99 | 100 | 82 | 84 | 83 | 83 | 73 | 74 | 80 | 78 | 81 |

As shown in Table 4, the rubber compositions of the examples containing a polymer composite of the present disclosure reversibly satisfy relationship (I) with respect to the temperature dependence of contact angles of water at two temperatures differing by at least 10° C. It is shown that the rubber compositions of the examples, which reversibly satisfy relationship (I) with respect to the temperature dependence of contact angles of water at two temperatures differing by at least 10° C., can reversibly vary tire performance in response to changes in temperature.

The invention claimed is:

1. A polymer composite, formed from at least one conjugated diene polymer having a weight average molecular weight of 100,000 or more as determined by gel permeation chromatography, the polymer composite reversibly satisfying the following relationship (II) with respect to a temperature dependence of contact angles of water at two temperatures differing by at least 10° C.:

Temperature dependence of contact angles: (Contact angle at lower temperature)/(Contact angle at higher temperature)×100≤90, and (II)

the polymer composite containing a backbone including a temperature-responsive polymer unit.

2. The polymer composite according to claim 1, wherein the temperature-responsive polymer unit shows a lower critical solution temperature in water.

3. The polymer composite according to claim 1, wherein the temperature-responsive polymer unit comprises a poly(N-substituted (meth)acrylamide).

4. The polymer composite according to claim 1, wherein the temperature-responsive polymer unit is represented by the following formula (I):

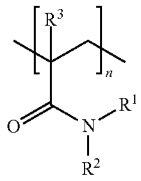

(I)

wherein n represents an integer of 1 to 1000; and $R^1$, $R^2$, and $R^3$ each independently represent a hydrogen atom or a hydrocarbyl group, provided that at least one of $R^1$ or $R^2$ is not a hydrogen atom, and $R^1$ and $R^2$ together may form a ring structure.

5. The polymer composite according to claim 1, wherein the temperature-responsive polymer unit comprises poly(N-isopropylacrylamide).

6. The polymer composite according to claim 1, wherein the conjugated diene polymer comprises an isoprene-based rubber.

7. The polymer composite according to claim 1, wherein the conjugated diene polymer comprises a polybutadiene rubber.

8. The polymer composite according to claim 1, wherein the conjugated diene polymer comprises a styrene-butadiene rubber.

9. The polymer composite according to claim 1, wherein the left-hand side of relationship (II) is not more than 88.

10. The polymer composite according to claim 1, wherein the left-hand side of relationship (II) is not more than 85.

11. The polymer composite according to claim 1, wherein the polymer composite is formed by stirring the conjugated diene polymer having a weight average molecular weight of 100,000 or more as determined by gel permeation chromatography, at least one radical generator, and at least one reactant having at least one heteroatom and at least one carbon-carbon double bond in at least one solvent selected from the group consisting of hydrocarbon solvents, aromatic solvents, and aprotic polar solvents at a temperature of at least 40° C. but not higher than 200° C.

12. The polymer composite according to claim 11, wherein the polymer composite satisfies the following relationship (III) with respect to a ratio of the reactant remaining before and after the stirring:

Ratio of remaining reactant: (Peak intensity of reactant before stirring)/[(Peak intensity of reactant before stirring)+(Peak intensity of reactant after stirring)]$\times 100 \leq 50$. (III)

13. The polymer composite according to claim 11, wherein the polymer composite satisfies the following relationship (IV) with respect to a ratio of a conjugated diene portion of the conjugated diene polymer remaining before and after the stirring:

Ratio of remaining conjugated diene portion: (Peak intensity of conjugated diene-derived double bonds before stirring)/[(Peak intensity of conjugated diene-derived double bonds before stirring)+(Peak intensity of conjugated diene-derived double bonds after stirring)]$\times 100 \leq 99$. (IV)

14. A rubber composition, comprising the polymer composite according to claim 1.

15. The rubber composition according to claim 14, wherein the rubber composition is for use in a tire tread.

16. A tire, comprising a tire component comprising the composition according to claim 14.

17. The tire according to claim 16, wherein the tire component is a tread.

18. A rubber composition, reversibly satisfying the following relationship (I) with respect to a temperature dependence of contact angles of water at two temperatures differing by at least 10° C.:

Temperature dependence of contact angles: (Contact angle at lower temperature)/(Contact angle at higher temperature)$\times 100 \leq 90$, (I)

wherein the rubber composition comprises a polymer composite formed from at least one conjugated diene polymer having a weight average molecular weight of 100,000 or more as determined by gel permeation chromatography, and the polymer composite contains a backbone including a temperature-responsive polymer unit.

19. The rubber composition according to claim 18, wherein the rubber composition comprises carbon black having a nitrogen adsorption specific surface area of 145 $m^2/g$ or more.

20. The rubber composition according to claim 18, wherein the rubber composition is for use in a tire tread.

21. A tire, comprising a tire component comprising the composition according to claim 18.

22. The tire according to claim 21, wherein the tire component is a tread.

* * * * *